United States Patent
Takeda et al.

(10) Patent No.: US 10,743,310 B2
(45) Date of Patent: Aug. 11, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 55 days.

(21) Appl. No.: 16/064,158

(22) PCT Filed: Dec. 22, 2016

(86) PCT No.: PCT/JP2016/088258
§ 371 (c)(1),
(2) Date: Jun. 20, 2018

(87) PCT Pub. No.: WO2017/110954
PCT Pub. Date: Jun. 29, 2017

(65) Prior Publication Data
US 2019/0007943 A1    Jan. 3, 2019

(30) Foreign Application Priority Data
Dec. 25, 2015    (JP) ................................ 2015-255282

(51) Int. Cl.
*H04W 72/04*    (2009.01)
*H04L 1/18*    (2006.01)
*H04W 72/12*    (2009.01)

(52) U.S. Cl.
CPC ....... *H04W 72/0446* (2013.01); *H04L 1/1812* (2013.01); *H04L 1/1861* (2013.01);
(Continued)

(58) Field of Classification Search
CPC .. H04W 72/04; H04W 72/1289; H04L 1/1812
See application file for complete search history.

(56) References Cited

U.S. PATENT DOCUMENTS

2014/0044092 A1* 2/2014 Guan ................ H04W 72/0413
                                                      370/330
2015/0237619 A1* 8/2015 Yang ................ H04W 72/0413
                                                      370/280

(Continued)

OTHER PUBLICATIONS

International Search Report issued in PCT/JP2016/088258 dated Jan. 31, 2017 (1 page).

(Continued)

*Primary Examiner* — Marcus Smith
(74) *Attorney, Agent, or Firm* — Osha Liang LLP

(57) ABSTRACT

The present invention is designed so that communication can be carried out adequately even when a plurality of CCs with different TTI durations are used. A user terminal can communicate with a radio base station by using a plurality of CCs (Component Carriers) having different transmission time interval (TTI) durations, and has a transmitting section that transmits UL signals to predetermined CCs, and a control section that controls transmission of the UL signals, and the control section controls the transmission of the UL signals for each CC group formed with at least one CC, and CCs that form each CC group are configured based on TTI durations.

3 Claims, 28 Drawing Sheets

(52) U.S. Cl.
CPC .......... *H04L 1/1864* (2013.01); *H04W 72/04* (2013.01); *H04W 72/1289* (2013.01)

(56) References Cited

U.S. PATENT DOCUMENTS

2016/0212734 A1* 7/2016 He .................. H04L 5/0055
2016/0295561 A1* 10/2016 Papasakellariou .. H04W 72/042

OTHER PUBLICATIONS

Written Opinion of the International Searching Authority issued in PCT/JP2016/088258 dated Jan. 31, 2017 (3 pages).
NTT Docomo, Inc.; "Discussions on TTI shortening"; 3GPP TSG RAN WG1 Meedting #84, R1-160966; St Julian's, Malta; Feb. 15-19, 2016 (6 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16878841.2, dated Nov. 19, 2018 (9 pages).
Samsung; "HARQ-ACK codebook determination for eCA"; 3GPP TSG RAN WG1 Meeting #82bis R1-155449; Malmö, Sweden, Oct. 5-9, 2015 (12 pages).
ZTE; "Remaining issues on dynamic HARQ-ACK codebook determination"; 3GPP TSG RAN WG1 Meeting #83 R1-156653; Anaheim, USA, Nov. 15-22, 2015 (3 pages).
LG Electronics; "HARQ-ACK payload adaptation for Rel-13 CA"; 3GPP TSG RAN WG1 Meeting #83 R1-156850; Anaheim, USA, Nov. 15-22, 2015 (10 pages).
Office Action in counterpart European Patent Application No. 16878841.2 dated Aug. 6, 2019 (5 pages).

* cited by examiner

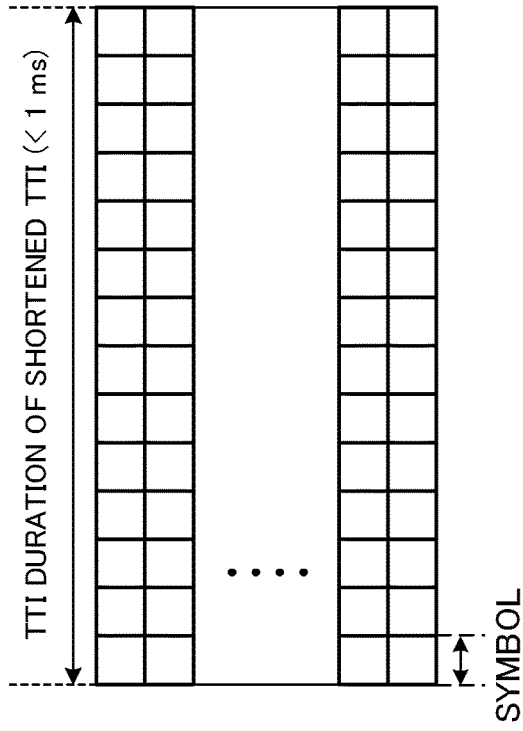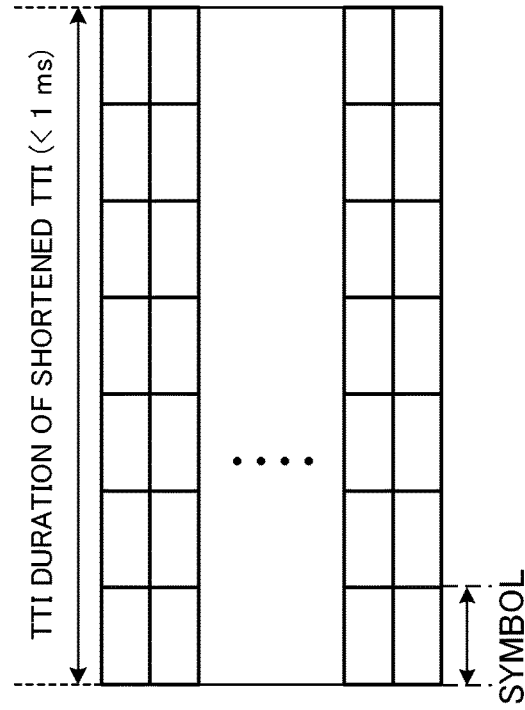
FIG. 3A
FIG. 3B

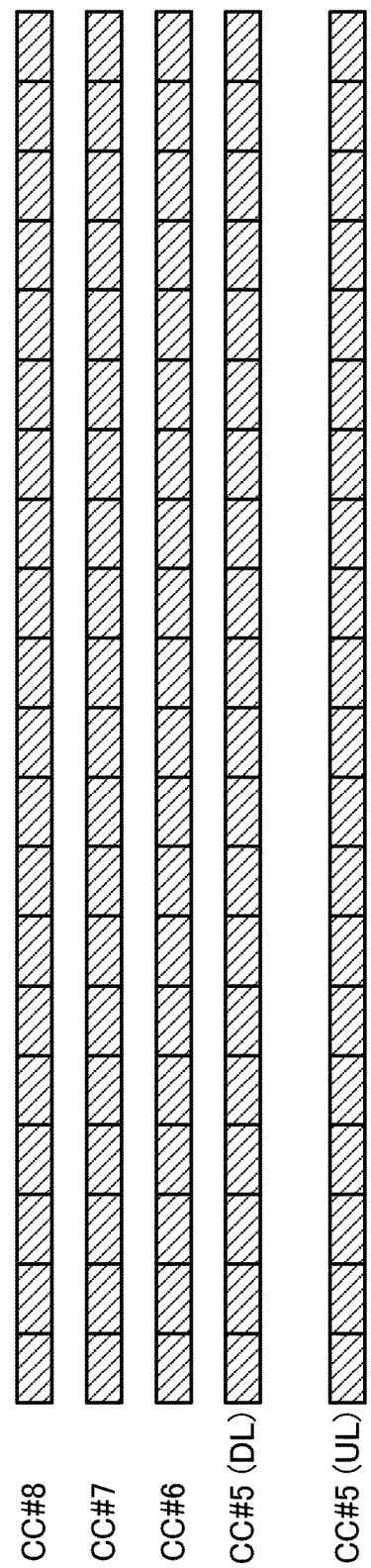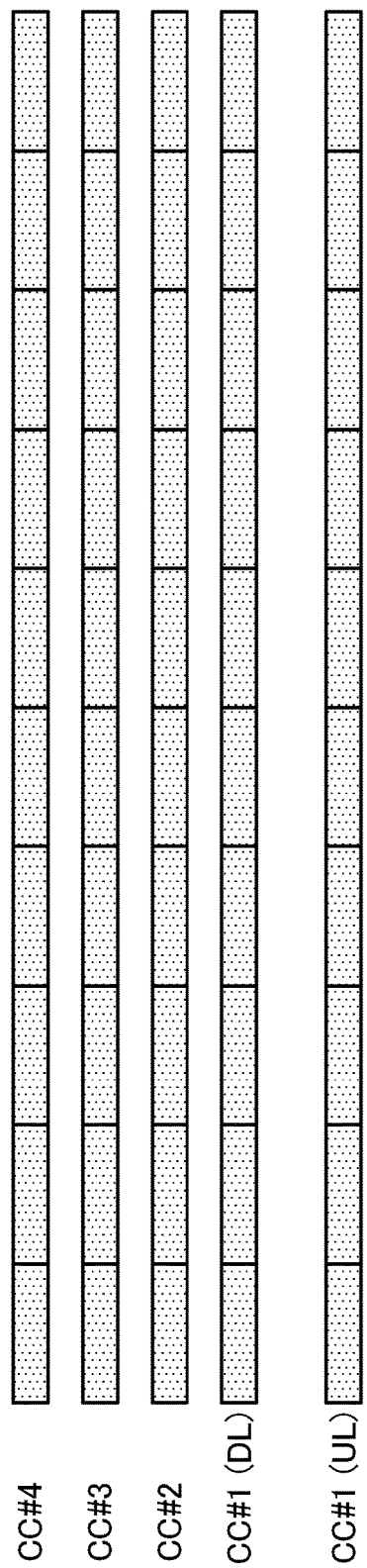
FIG. 5

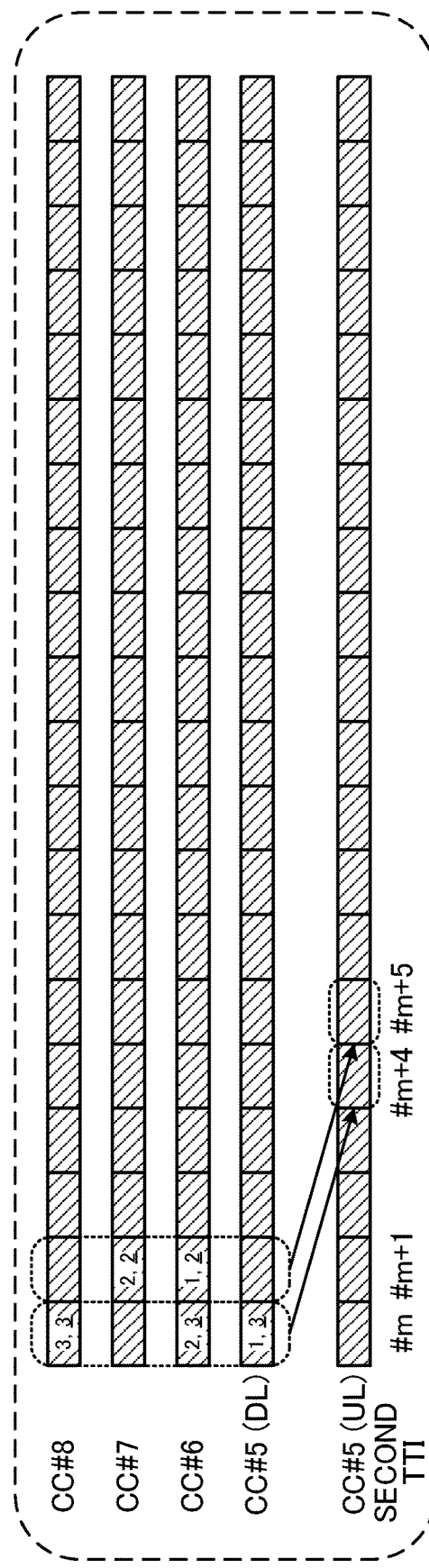
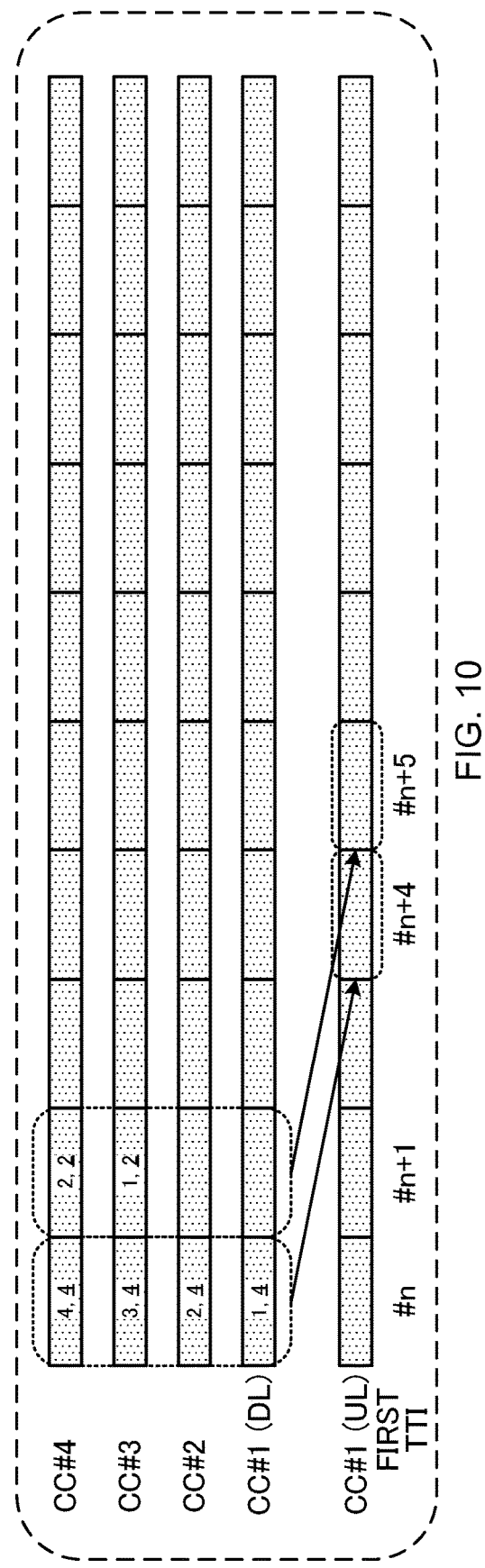
FIG. 10

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunication System) network, the specifications of long term evolution (LTE) have been drafted for the purpose of further increasing high speed data rates, providing lower delays and so on (see non-patent literature 1). The specifications of LTE-advanced (also referred to as LTE "Rel. 10," "Rel. 11" or "Rel. 12") have been drafted for the purpose of further broadbandization and speed-up from LTE (also referred to as "LTE Rel. 8"), and a successor system (LTE of Rel. 13 and later versions) is also under study.

Carrier aggregation (CA) to integrate multiple component carriers (CC) is introduced in LTE Rel. 10/11 in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

On the other hand, in LTE Rel. 12, dual connectivity (DC), in which multiple cell groups (CG) formed by different radio base stations are configured in a user terminal, is also introduced. Each cell group consists of at least one cell (CC). In DC, since multiple CCs of different radio base stations are integrated, DC is also referred to as "inter-eNB CA."

In above-mentioned LTE Rel. 8 to 12, the transmission time intervals (TTIs) that are applied to DL transmission and UL transmission between radio base stations and user terminals are configured to one ms and controlled. Transmission time intervals are also referred to as "communication time intervals," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In radio communication systems after LTE Rel. 13 (for example, 5 G), it is assumed that communication in a high frequency band such as several tens of GHz, or communication with a relatively small amount of data such as IoT (Internet of Things), MTC (Machine Type Communication), M2M (Machine To Machine) or the like is performed. The demand for D2D (Device To Device) and V2V (Vehicular To Vehicular) communication, which requires low-delay communication, is also increasing.

Reduction of communication delay (latency reduction) is being studied in order to provide sufficient communication services in such future radio communication systems. For example, a study is in progress to make the transmission time intervals (TTIs), which are the minimum unit of scheduling, shorter than the one-ms TTIs of existing LTE systems (LTE Rel. 8 to 12), and communicate by using these TTIs (may be referred to as, for example, "shortened TTIs").

Also, although, in Rel. 12 or earlier versions, the maximum number of CCs that can be configured in CA is 5, the number of CCs that can be configured in CA is expected to be increased (to 32 CCs, for example) in Rel. 13 and later versions. In this case, it may be possible that a user terminal connects with a plurality of cells using different TTIs and performs communication (for example, CA and/or DC).

Meanwhile, when communication is made using multiple CCs with different TTI durations, how to control communication is the problem. For example, when a radio base station and/or a user terminal communicate using a plurality of cells having different TTI durations, how to control the transmission/receiving timing in each CC becomes the problem.

The present invention has been made in view of the above points, and it is therefore an object of the present invention to provide a user terminal, a radio base station, and a radio communication method that allow adequate communication to be carried out even when a plurality of CCs with varying TTI durations are used.

Solution to Problem

One aspect of the user terminal of the present invention provides a user terminal that can communicate with a radio base station by using a plurality of CCs (Component Carriers) having different transmission time interval (TTI) durations, and that has a transmitting section that transmits UL signals to predetermined CCs, and a control section that controls transmission of the UL signals, and, in this user terminal, the control section controls the transmission of the UL signals for each CC group formed with at least one CC, and CCs that form each CC group are configured based on TTI durations.

Advantageous Effects of Invention

According to the present invention, communication can be performed appropriately even when a plurality of CCs having different TTI durations are used.

BRIEF DESCRIPTION OF DRAWINGS

FIG. 3A and FIG. 3B are diagrams to show examples of configurations of shortened TTIs;

FIG. 5 is a diagram to show examples of CC groups in the first embodiment;

FIG. 10 is a diagram to show an example of a method of configuring counter DAIs and total DAIs according to the first embodiment;

DESCRIPTION OF EMBODIMENTS

Figure 1:
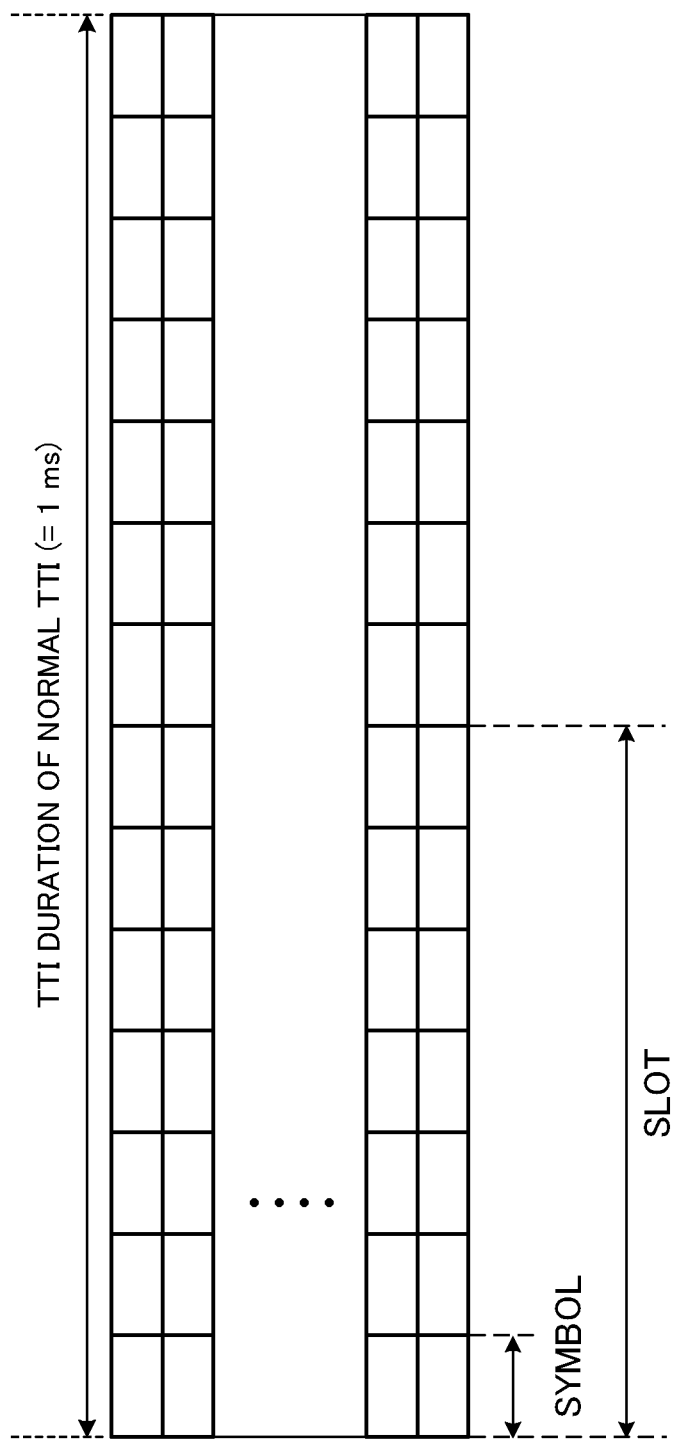
FIG. 1 is a diagram to show an example of transmission time intervals (TTIs) in existing LTE systems (Rel. 8 to 12)

FIG. 1 is a diagram to explain an example of transmission time intervals (TTIs) in existing systems (LTE Rel. 8 to 12). As shown in FIG. 1, a TTI in LTE Rel. 8 to 12 (hereinafter referred to as a "normal TTI") has a time duration of one ms. A normal TTI is also referred to as a "subframe," and is comprised of two time slots. A TTI is one channel-coded data packet (transport block) transmission time unit, and is the processing unit in scheduling, link adaptation, etc.

As shown in FIG. 1, when normal cyclic prefixes (CPs) are used in the downlink (DL), a normal TTI includes 14 OFDM (Orthogonal Frequency Division Multiplexing) symbols (seven OFDM symbols per slot). Each OFDM symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Also, when normal cyclic prefixes (CPs) are used in the uplink (UL), a normal TTI is configured to include 14 SC-FDMA (Single Carrier Frequency Division Multiple Access) symbols (seven SC-FDMA symbols per slot). Each SC-FDMA symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Incidentally, when extended CPs are used, a normal TTI may include 12 OFDM symbols (or 12 SC-FDMA symbols). In this case, each OFDM symbol (or each SC-FDMA symbol) has a time duration of 66.7 μs, and an extended CP of 16.67 μs is appended.

On the other hand, in future radio communication systems such as Rel. 13 and later LTE and 5G, a radio interface that is suitable for high frequency bands such as several tens of GHz or the like and a radio interface that minimizes delay for IoT (Internet of Things), MTC (Machine Type Communication), M2M (Machine To Machine), D2D (Device To Device) and V2V (Vehicular To Vehicular) services are in demand.

Figure 2:
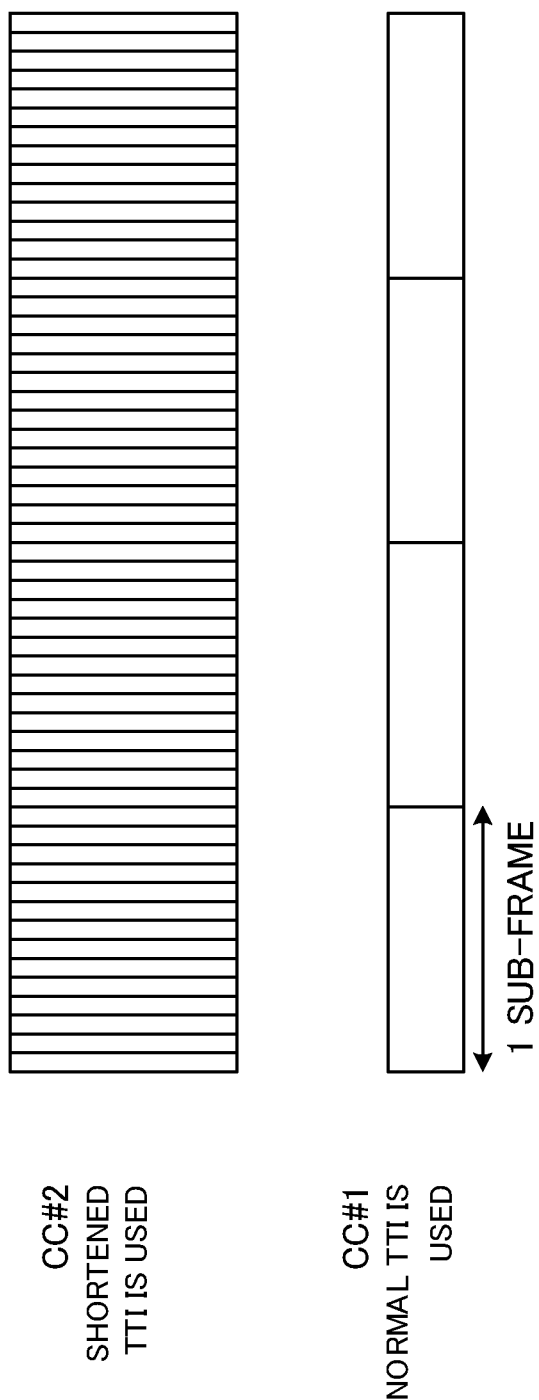
FIG. 2 is a diagram to explain a normal TTI and a shortened TTI.

Therefore, in future communication systems, it may be possible that communication is performed using shortened TTIs, which are TTIs shorter than one ms (see FIG. 2). FIG. 2 shows a cell (CC #1) using normal TTIs (one ms) and a cell (CC #2) using shortened TTIs. Also, when shortened TTIs are used, it may be possible to change the subcarrier period from the subcarriers of normal TTIs (for example, the subcarrier period may be expanded).

When TTIs of a shorter time length than normal TTIs (hereinafter referred to as "shortened TTIs") are used, the time margin for processing (for example, encoding and decoding) in the user terminal and the radio base station increases, so that the processing delay can be reduced. Also, when shortened TTIs are used, it is possible to increase the number of user terminals that can be accommodated per unit time (for example, one ms). Below, the configuration of shortened TTIs and so on will be explained.

(Configuration Example of Shortened TTIs)

A configuration example of shortened TTIs will be described with reference to FIG. 3. As shown in FIG. 3A and FIG. 3B, shortened TTIs have a time duration (TTI duration) shorter than one ms. A shortened TTI may be one TTI duration or multiple TTI durations, whose multiples are one ms, such as 0.5 ms, 0.25 ms, 0.2 ms and 0.1 ms, for example. Alternatively, when normal CPs are used, a normal TTI contains 14 symbols, so that one TTI duration or multiple TTI durations, whose multiples are integral multiples of 1/14 ms, such as 7/14 ms, 4/14 ms, 3/14 ms and 1/14 ms, may be used. Also, when extended CPs are used, a normal TTI contains 12 symbols, so that one TTI duration or multiple TTI durations, whose multiples are integral multiples of 1/12 ms, such as 6/12 ms, 4/12 ms, 3/12 ms and 1/12 ms, may be used. Also in shortened TTIs, similar to conventional LTE, whether to use normal CPs or use extended CPs can be configured with higher layer signaling such as broadcast information and RRC signaling. By this means, it is possible to introduce shortened TTIs, while maintaining compatibility (synchronization) with one-ms normal TTIs.

Note that, although FIG. 3A and FIG. 3B illustrate example cases of using normal CPs, the present invention is not limited to these. A shortened TTI needs only be a shorter time duration than a normal TTI, and the number of symbols in the shortened TTI, the duration of symbols, the duration of CPs and suchlike configurations can be determined freely. Also, although examples will be described below in which OFDM symbols are used in the DL and SC-FDMA symbols are used in the UL, the present invention is not limited thereto.

FIG. 3A is a diagram to show a first configuration example of shortened TTIs. As shown in FIG. 3A, in the first configuration example, a shortened TTI is comprised of 14 OFDM symbols (or SC-FDMA symbols), which is equal in number to a normal TTI, and each OFDM symbol (each SC-FDMA symbol) has a symbol duration shorter than the symbol duration (=66.7 μs) of the normal TTI.

As shown in FIG. 3A, when maintaining the number of symbols in a normal TTI and shortening the symbol duration, the physical layer signal configuration (arrangement of REs, etc.) of normal TTIs can be reused. In addition, when maintaining the number of symbols in a normal TTI, it is possible to include, in a shortened TTI, the same amount of information (the same amount of bits) as in a normal TTI. On the other hand, since the symbol time duration differs from that of normal TTI symbols, it is difficult, as shown in FIG. 2A, to frequency-multiplex a signal with shortened TTIs and a signal with normal TTIs in the same system band (or the cell, the CC, etc.).

Also, since the symbol duration and the subcarrier period are each the reciprocal of the other, as shown in FIG. 3A, when shortening the symbol duration, the subcarrier period is wider than the 15-kHz subcarrier period of normal TTIs. When the subcarrier period becomes wider, it is possible to effectively suppress the inter-channel interference caused by the Doppler shift when the user terminal moves and the communication quality degradation due to phase noise in the receiver of the user terminal. In particular, in high frequency bands such as several tens of GHz, the deterioration of communication quality can be effectively suppressed by expanding the subcarrier period.

FIG. 3B is a diagram to show a second configuration example of a shortened TTI. As shown in FIG. 3B, according to the second configuration example, a shortened TTI is comprised of a smaller number of OFDM symbols (or SC-FDMA symbols) than a normal TTI, and each OFDM symbol (each SC-FDMA symbol) has the same symbol duration (=66.7 ∥s) as a normal TTI. In this case, the shortened TTI can be configured using symbol units in a normal TTI. For example, a shortened TTI can be formed by using some of the 14 symbols included in one subframe. In FIG. 3B, a shortened TTI is comprised of seven OFDM symbols (SC-FDMA symbols), which is half of a normal TTI.

As shown in FIG. 3B, when reducing the symbol duration and reducing number of symbols, the amount of information (the amount of bits) included in a shortened TTI can be reduced lower than in a normal TTI. Therefore, the user terminal can perform the receiving process (for example, demodulation, decoding, etc.) of the information included in a shortened TTI in a shorter time than a normal TTI, and therefore the processing delay can be shortened. Also, since the shortened-TTI signal shown in FIG. 3B and a normal-TTI signal can be frequency-multiplexed within the same system band (or the cell, the CC, etc.), compatibility with normal TTIs can be maintained.

(Example of Configuration of Shortened TTI)

An example of the configuration of shortened TTIs will be described. When shortened TTIs are used, it is also possible to configure both normal TTIs and shortened TTIs in a user terminal in order to have compatibility with existing systems (LTE Rel. 8 to 12). FIG. 4 show an example of the configuration of normal TTIs and shortened TTIs. Note that FIG. 4 are merely examples, and these are by no means limiting.

Figure 4A:
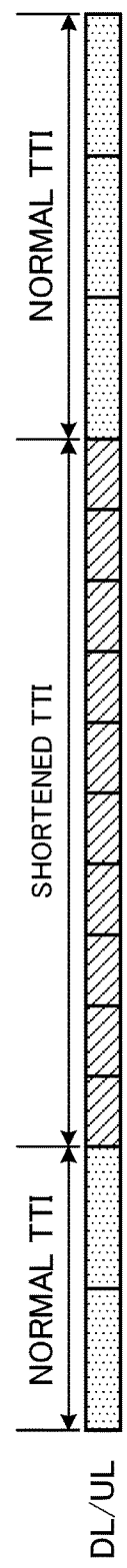
FIG. 4A to FIG. 4C are diagrams to show examples of configurations of normal TTIs and shortened TTIs.

FIG. 4A is a diagram to show an example of the first configuration of shortened TTIs. As shown in FIG. 4A, normal TTIs and shortened TTIs may coexist in time in the same component carrier (CC) (frequency domain). To be more specific, shortened TTIs may be configured in specific subframes (or specific radio frames) of the same CC. For example, in FIG. 4A, shortened TTIs are configured in five consecutive subframes in the same CC, and normal TTIs are configured in the other subframes. For example, as specific subframes, subframes that can be configured as MBSFN subframes, or subframes that include (or do not include) specific signals such as the MIB or synchronization channels may be used. The number and positions of subframes where shortened TTIs are configured are not limited to those shown in FIG. 4A.

Figure 4B:
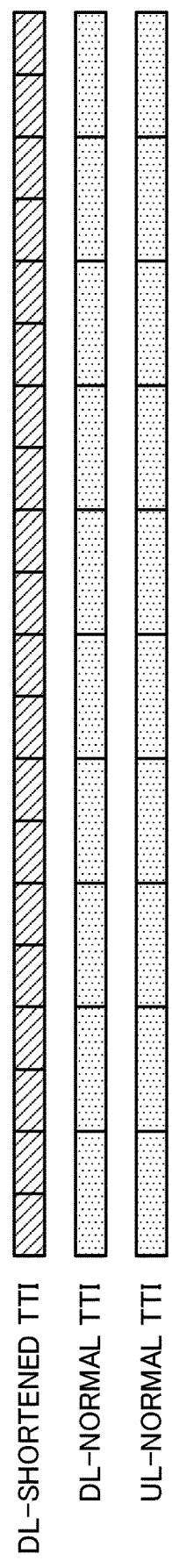

FIG. 4B is a diagram to show an example of a second configuration of shortened TTIs. Carrier aggregation (CA) or dual connectivity (DC) may be performed by integrating CCs with normal TTIs and CCs with shortened TTIs, as shown in FIG. 4B. To be more specific, shortened TTIs may be configured in specific CCs (more specifically in the DL and/or the UL of particular CCs). For example, in FIG. 4B, shortened TTIs are configured in the DL of a particular CC and normal TTIs are configured in the DL and UL of another CC. Note that the number and locations of CCs where shortened TTIs are configured are not limited to those shown in FIG. 4B.

In the case of CA, shortened TTIs may also be configured in specific CCs (the primary (P) cell and/or secondary (S) cells) of the same radio base station. On the other hand, in the case of DC, shortened TTIs may be configured in specific CCs (P cell and/or S cells) in the master cell group (MCG) formed by the first radio base station, or shortened TTIs may be configured in specific CCs (primary secondary (PS) cells and/or S cells) in a secondary cell group (SCG) formed by a second radio base station.

Figure 4C:

FIG. 4C is a diagram to show an example of a third configuration of shortened TTIs. As shown in FIG. 4C, shortened TTIs may be configured in either the DL or the UL. For example, in FIG. 4C, a case is shown in which, in a TDD system, normal TTIs are configured in the UL and shortened TTIs are configured in the DL.

Also, specific DL or UL channels or signals may be assigned to (configured in) shortened TTIs. For example, an uplink control channel (PUCCH: Physical Uplink Control Channel) may be allocated to normal TTIs, and an uplink shared channel (PUSCH: Physical Uplink Shared Channel) may be allocated to shortened TTIs. In this case, for example, the user terminal transmits the PUCCH in normal TTIs and transmits the PUSCH in shortened TTIs.

Also, a multiple-access scheme that is different from OFDM (or SC-FDMA), which is the multiple-access scheme of LTE Rel. 8 to 12, may be assigned to (configured in) shortened TTIs.

(Example of Reporting of Shortened TTIs)

As mentioned above, when cells using shortened TTIs are configured in a user terminal, the user terminal can configure (and/or detect) the shortened TTIs based on implicit or explicit reporting from the radio base station. Hereinafter, as examples of shortened TTI reporting applicable to this embodiment, a case of (1) implicit reporting, or cases of using at least one of (2) broadcast information or RRC (Radio Resource Control) signaling, (3) MAC (Medium Access Control) signaling and (4) PHY (Physical) signaling will be described.

(1) When implicit reporting is used, the user terminal may configure shortened TTIs (including, for example, judging that the communicating cell, channel, signal, etc. are shortened TTIs) based on the frequency band (for example, a band for 5G, an unlicensed band, etc.), the system bandwidth (for example, 100 MHz, etc.), whether or not LBT (Listen Before Talk) is employed in LAA (License Assisted Access), the type of data to be transmitted (for example, control data, voice, etc.), the logical channel, transport block, RLC (Radio Link Control) mode, C-RNTI (Cell-Radio Network Temporary Identifier) and the like.

Also, when control information (DCI) addressed to the subject terminal is detected in a PDCCH mapped to the first one, two, three or four symbols of a normal TTI and/or in a one-ms EPDCCH, the user terminal may judge that the one ms where the PDCCH/EPDCCH are included is a normal TTI, and, when control information (DCI) addressed to the subject terminal is detected in a PDCCH/EPDCCH configured otherwise (for example, a PDCCH mapped to symbols other than the first one to four symbols in a normal TTI and/or an EPDCCH that is less than one ms), the user terminal may then judge that a predetermined time period including the PDCCH/EPDCCH is a shortened TTI. Here, the control information (DCI) addressed to the subject terminal can be detected based on the CRC check result of blind-decoded DCI.

(2) When broadcast information or RRC signaling is used, shortened TTIs may be configured based on configuration information reported from the radio base station (for example, a first cell) to the user terminal by broadcast information or RRC signaling. The configuration information indicates, for example, information on CCs and/or subframes using shortened TTIs, information on channels and/or signals using shortened TTIs, Information on TTI duration of shortened TTI, etc. The user terminal configures shortened TTIs semi-statically based on the configuration information from the radio base station. Note that mode switching between shortened TTIs and normal TTIs may be performed in the RRC reconfiguration step or may be performed in intra-cell handover (HO) in P cells or in the removal/addition steps of CCs (S cells) in S cells.

(3) When MAC signaling is used, shortened TTIs that are configured based on configuration information reported through RRC signaling may be activated or deactivated by MAC signaling. To be more specific, the user terminal activates or de-activates shortened TTIs based on MAC control elements from the radio base station. The user terminal may be preconfigured with a timer indicating the activation period of shortened TTIs by way of higher layer signaling such as RRC signaling, and shortened TTIs may be de-activated if, after shortened TTIs are activated by an L2 control signal, there is no UL/DL allocation in shortened TTIs for a predetermined period. This shortened TTI deactivation timer may count normal TTIs (one ms) as units, or count shortened TTIs (for example, 0.25 ms) as units.

Note that when the mode is switched between shortened TTIs and normal TTIs in an S cell, the S cell may be de-activated once, or it may be possible to consider that the TA (Timing Advance) timer has expired. By this means, it is possible to provide a non-communicating period when switching the mode.

(4) When PHY signaling is used, shortened TTIs that are configured based on configuration information reported by RRC signaling may be scheduled by PHY signaling. To be more specific, the user terminal detects shortened TTIs based on information included in a downlink control channel that is received and detected (PDCCH (Physical Downlink Control Channel) or EPDCCH (Enhanced Physical Downlink Control Channel) (hereinafter referred to as "PDCCH/EPDCCH").

For example, it is assumed that control information (DCI) for assigning transmission or reception in normal TTIs and shortened TTIs includes different information elements, and, (4-1) when the user terminal detects control information (DCI) including an information element that assigns transmission and reception in shortened TTIs, the user terminal identifies a predetermined time period including the timing where the PDCCH/EPDCCH is detected as a shortened TTI. The user terminal can blind-decode control information (DCI) for assigning transmission or reception in both normal TTIs and shortened TTIs in the PDCCH/EPDCCH. Alternatively, (4-2) when the user terminal detects control information (DCI) including an information element that assigns transmission/reception in shortened TTIs, the user terminal may identify a predetermined time period, in which the timing the PDSCH or the PUSCH scheduled by the PDCCH/EPDCCH (downlink control information (DCI) communicated in the PDCCH/EPDCCH) is transmitted/received is included, as a shortened TTI. Alternatively, (4-3) when a user terminal detects DCI including an information element that assigns transmission/reception in shortened TTIs, the user terminal may identify a predetermined time period, in which the timing to transmit or receive retransmission control information for the PDSCH or the PUSCH scheduled by the PDCCH/EPDCCH (DCI communicated in the PDCCH/EPDCCH) is included, as a shortened TTI.

Further, the user terminal may detect shortened TTIs based on the state of the user terminal (for example, the idle state or the connected state). For example, if the user terminal is in the idle state, the user terminal may identify all the TTIs as normal TTIs and blind decode only the PDCCHs included in the first to fourth symbols of the normal TTIs of one ms. Also, if the user terminal is in the connected state, the user terminal may configure (and/or detect) shortened TTIs based on the reporting of at least one of (1) to (4) described above as examples.

As described above, in future radio communication, it is assumed that communication is performed by applying shortened TTIs, which are transmission time intervals reduced to be shorter than normal TTIs, to UL transmission and/or DL transmission. Further, in the future radio communication, as shown in FIG. 4B, it may be possible that communication (for example, CA or DC) is performed using a plurality of cells having different TTI durations. However, in such a case, how to control the communication method (for example, transmission timing, receiving timing, etc.) in UL communication and/or DL communication is the problem.

Therefore, as one aspect of the present invention, assuming the case where the user terminal communicates using a plurality of cells (or CCs, carriers, etc.) having different TTI durations, the inventors of the present invention have come up with the idea of configuring CC groups according to the TTI durations of CCs and controlling UL transmission and/or DL transmission on a per CC group basis. By doing so, the data communication rate in the user terminal can be improved and the latency can be reduced.

A CC group can be the transmission timing control unit in UL transmission and/or DL transmission. For example, when CA is applied, based on the assumption that a PUCCH group is a CC group, PUCCH groups can be formed with CCs with the same TTI duration. Also, when DC is applied, based on the assumption that a cell group is a CC group, cell groups can be formed with CCs with the same TTI duration.

When CA is applied, a user terminal can apply a transmission method used in CA in existing systems for each PUCCH group comprised of CCs of the same TTI duration. Also, when DC is applied, it is possible to apply a communication control method used in DC by forming cell groups respectively configured by different radio base stations with CC having the same TTI duration.

Note that a PUCCH group is a group including one or more CCs (cells), and refers to a group formed with CCs that transmit uplink control information (UCI) using the PUCCH of a predetermined CC. Examples of uplink control information include HARQ-ACKs, channel state information (CSI), and the like. The CC where the PUCCH is configured among the CCs included in a PUCCH group is also referred to as the "PUCCH cell," the "PUCCH CC," or the "PUCCH Cell." For example, when the PUCCH cell is a secondary cell (SCell), the user terminal transmits the PUCCH in the CC that serves as the PUCCH SCell (for example, the SCell with the smallest cell index in the PUCCH group). In this manner, by feeding back uplink control information (HARQ-ACK, etc.) in response to DL data transmitted in a plurality of CCs forming a cell group in a predetermined CC, the effect of single carrier nature can be obtained.

In addition, as another aspect of the present invention, the inventors of the present invention have found that, when a user terminal communicates using a plurality of cells having different TTI durations, UL transmission and/or DL transmission can be controlled by forming the same CC group with a plurality of CCs having different TTI durations.

For example, if a CC group is formed with multiple CCs with different TTI durations, it is possible to perform control so that uplink control information corresponding to each CC is transmitted at different timings, using a predetermined CC, according to the TTI durations of CCs. As a result, the data communication rate in the user terminal can be improved and the latency can be reduced, and, furthermore, it is possible to transmit uplink control information and so on in one UL (CC), even if the user terminal connects with multiple CCs with different TTI durations.

Now, the present embodiment will be described below in detail. In the following description, a first TTI duration (1 ms) and a second TTI duration (0.5 ms) will be explained as TTI durations of examples, but the applicable TTI durations and TTI duration types are not limited to these. TTI having the first TTI duration may be referred to as "regular TTIs," "normal TTIs," "long TTIs," "regular subframes," "normal subframes," or "long subframes." TTIs having the second TTI duration may be referred to as "shortened TTIs," "short TTIs," "shortened subframes," or "short subframes." In the following description, an LTE system will be shown as an example, but the present embodiment is not limited to this, and any system can be applied as long as it uses a plurality of CCs of varying TTI durations. Further, a plurality of examples described below can be implemented in appropriate combination.

First Embodiment

In the first embodiment, a case where CC groups are configured according to the TTI durations of CCs will be explained. In the following description, it is shown that two CC groups are configured, but the number of CC groups and the number of CCs forming each CC group are not particularly limited. In addition, each CC can use FDD or TDD as appropriate.

First Example

FIG. 5 shows an example in which two CC groups (first CC group and second CC group) are configured according to the TTI durations of CCs. The first CC group (CC group #1) is comprised of CC #1 to CC #4 to which the first TTI duration is applied, and the second CC group (CC group #2) is comprised of CC #5 to CC #8 to which the second TTI duration is applied. Here, it is shown that the first TTI duration is 1 ms and the second TTI duration is 0.5 ms, but the TTI durations to apply to each CC group (CC) are not limited to these.

For example, when CA is employed, it is possible to control UL transmission and/or DL transmission per PUCCH group, with the first CC group as the primary PUCCH group and the second CC group as a secondary PUCCH group. The TTI duration of each PUCCH group can be included in higher layer signaling, such as RRC signaling, which reports configuration and reconfiguration of CC groups.

Also, when DC is applied, it is possible to control UL transmission and/or DL transmission per cell group, with the first CC group as the primary cell group (master cell group (MCG)) and the second CC group as a secondary cell group (SCG). The TTI duration of each cell group can be included in higher layer signaling, such as RRC signaling, which reports configuration and reconfiguration DC and/or cell groups. This higher layer signaling may be transmitted and received only from the CCs belonging to the MCG.

When DC is applied, the user terminal may communicate with different radio base stations between the MCG and SCGs. To realize this, backhaul signaling may be introduced, in which the MeNB controlling the MCG and the SeNB controlling the SCG report the TTI duration of each cell group to each other. For example, signaling may be introduced in which the MeNB specifies to the SeNB the TTI duration which the user terminal uses when communicating with the SCG. This allows the SeNB to recognize the TTI duration used by the user terminal when communicating with the SCG, which is configured in the user terminal by the MeNB via higher layer signaling, so that the SeNB can properly communicate with the user terminal.

Signaling may also be introduced in which one or more TTI durations which the user terminal can use when communicating with the SCG are reported from the SeNB to the MeNB. As a result, the MeNB can recognize the TTI duration that the SeNB can use for communication with the user terminal, and the MeNB can select an appropriate TTI duration out of the TTI durations that the SeNB can use for communication and configure it in the user terminal. If TTI durations that can be used when the user terminal communicates with the SCG are not reported from SeNB to MeNB, the MeNB may recognize that the 1-ms normal TTI, specified in conventional LTE, is the only TTI duration that can be configured in the SeNB.

Figure 6:
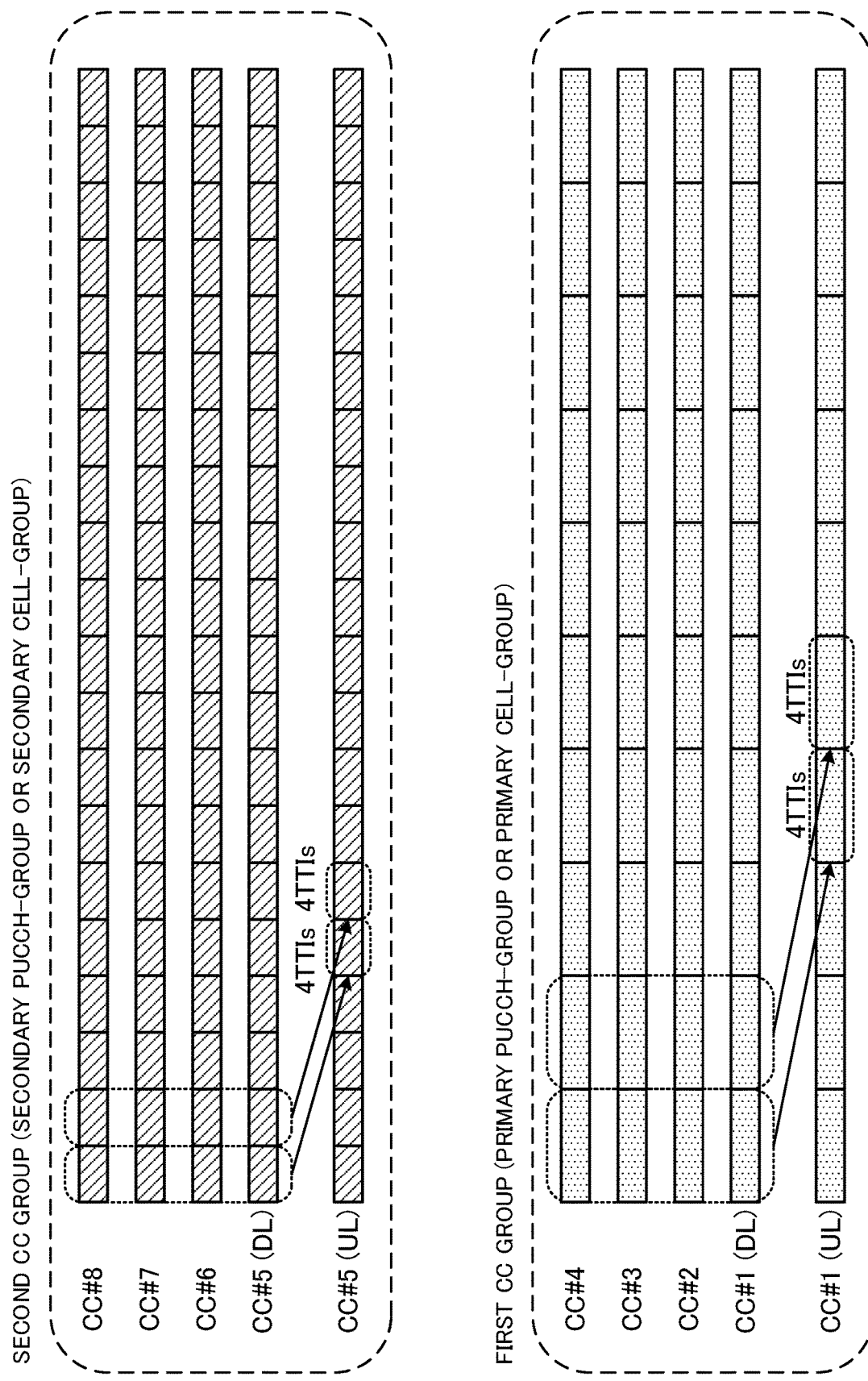
FIG. 6 is a diagram to show examples of UL transmission timings in the first embodiment.

In this way, it is possible to simplify the control of transmission/receiving timings by forming one CC group with only CCs of the same TTI duration and controlling, individually, scheduling and/or HARQ feedback on a per CC group basis. FIG. 6 shows an example of controlling HARQ-ACK feedback timing per CC group.

FIG. 6 shows a case where the transmission timing of uplink control information corresponding to each CC is controlled in TTI units in each CC group. To be more specific, in the case shown in FIG. 6, when DL data (for example, PDSCH) is received in each CC, the user terminal transmits HARQ-ACKs (A/Ns) in response to the DL data a predetermined number of TTIs later. In this case, the A/Ns corresponding to each CC can be multiplexed and transmitted on the uplink control channel of a specific CC (for example, PCell, PSCell, PUCCH SCell, etc.).

In the case shown in FIG. 6, in the first CC group and the second CC group, the user terminal feeds back uplink control information four TTIs after DL data is received. In this case, even when the first CC group and the second CC group are scheduled at the same timing, the feedback timing in the second CC group where the TTI duration is shorter arrives earlier. Note that the feedback timing is not limited to four TTIs later. Also, different TTIs may be configured as the feedback timings of the first CC group and the second CC group.

Alternatively, when receiving downlink control information (for example, UL grant) in each CC group, the user terminal can transmit uplink data (for example, PUSCH) in response to the UL grant a predetermined number of TTIs later (for example, four TTIs later). Of course, different TTIs may be configured between the first CC group and the second CC group as uplink data transmission timings.

Thus, the user terminal performs scheduling and/or HARQ timing control independently for each CC group. Also, scheduling and/or HARQ timing control can be configured based on the TTI duration in each CC group (the TTI durations of CCs forming each CC group). Also, after uplink data is transmitted from the user terminal, the period until HARQ transmitted from the radio base station arrives can be a predetermined number of TTIs.

Also, cross-carrier scheduling when CA is applied, transmission of uplink control information (UCI on PUSCH) using an uplink data channel (PUSCH), CSI measurement/reporting, and so on can also be controlled on a per CC group basis. Also, the timing to apply cell (CC)-configuring activation/de-activation commands may also be configured per CC group based on the TTI duration (for example, in proportion to the TTI duration). The count of the number of subframes in the activation/deactivation timer and the PHR reporting timer controlled under the MAC layer may also be based on the configured TTI duration.

By controlling communication on a per CC group basis in this way, it is possible to communicate using a large number of CCs, and at the same time, it is possible to obtain an advantage by shortening the TTI duration, so that delay can be reduced by applying CC groups with short TTI durations and increased peak rates can be achieved by applying CA or DC.

The radio base station can report (configure) information on CC groups and/or the TTI duration of each CC group (the TTI durations of CCs included in CC groups) to the user terminal.

For example, the radio base station can report CC group information, including at least one of information on the CC groups configured, information on the TTI durations of the CC groups, information on the CCs included in the CC groups configured and information on the TTI duration of the CCs, to the user terminal. In this case, the radio base station can report the CC group information to the user terminal by higher layer signaling, downlink control information or a combination thereof.

Further, the radio base station can report (configure) the CC groups as the cell groups when DC is applied or as the PUCCH groups when CA is applied, to the user terminal.

Alternatively, the radio base station reports only the information of CC groups, and the PUCCH groups and the cell groups may be configured on the user terminal side based on the information reported at the time CA and/or DC are applied.

Further, the TTI duration that is configured in the user terminal may be made CC group-specific information or may be made CC-specific information. When the TTI duration is made CC-specific information, the user terminal can assume that all the CCs in the same CC group have the same TTI duration.

Second Example

In a second example, the UL transmission power configuration method for use when multiple CC groups (here, the first CC group and the second CC group) are configured according to the TTI durations of CCs will be described.

When CC groups are configured according to the TTI durations of CC as shown in FIG. 5 above, UL transmission is performed simultaneously between CCs with different TTI durations.

In this case, if the TTI duration differs between a plurality of UL cells (CCs), there is a possibility that the transmission period does not necessarily match between the cells. That is, if transmission power control that is based on the premise that the transmission period matches as in uplink CA in existing systems is applied, on an as-is basis, to UL transmission using multiple CCs (CC groups) with different TTI durations, there is a possibility that a problem arises.

Therefore, in the second example, if the TTI duration differs between UL cells, it is effective to apply a power control method in which power is preferentially configured for cells with early transmission timings. For example, when DC is used, power control can be performed among UL cells having different TTI durations using UL transmission power control (for example, DC PC mode 2) that is applied when cell groups are asynchronous.

To be more specific, when the TTI duration differs between CCs, it is possible to configure the minimum guaranteed power to assign to each CC, and assign the remaining power to CCs with earlier transmission timings. The remaining power (surplus power) corresponds to the surplus power that is left after the minimum guaranteed power of each CC is subtracted from the maximum transmission power (Pcmax) of the user terminal.

Alternatively, if the TTI duration differs between UL cells, a configuration using DC PC mode 2 may be adopted only when the transmission starting timing differs by more than a predetermined value (for example, 35 µs) between the cells. For example, when the transmission timings match between the cells, the user terminal applies the power control for UL-CA, or applies the UL transmit power control (for example, DC PC mode 1) that is used when cell groups are synchronous in DC. In this case, the user terminal can determine the transmission power to allocate to each cell according to the priority that is configured based on the channel type and/or the content of uplink control information.

When the transmission timings do not match between cells, the user terminal can apply the UL transmission power control that is used when cell groups are asynchronous in DC (for example, DC PC mode 2). Whether the transmission timings do not match between cells can be judged based on, for example, whether or not the transmission starting timings differ by more than a predetermined value between the cells.

Figure 7:
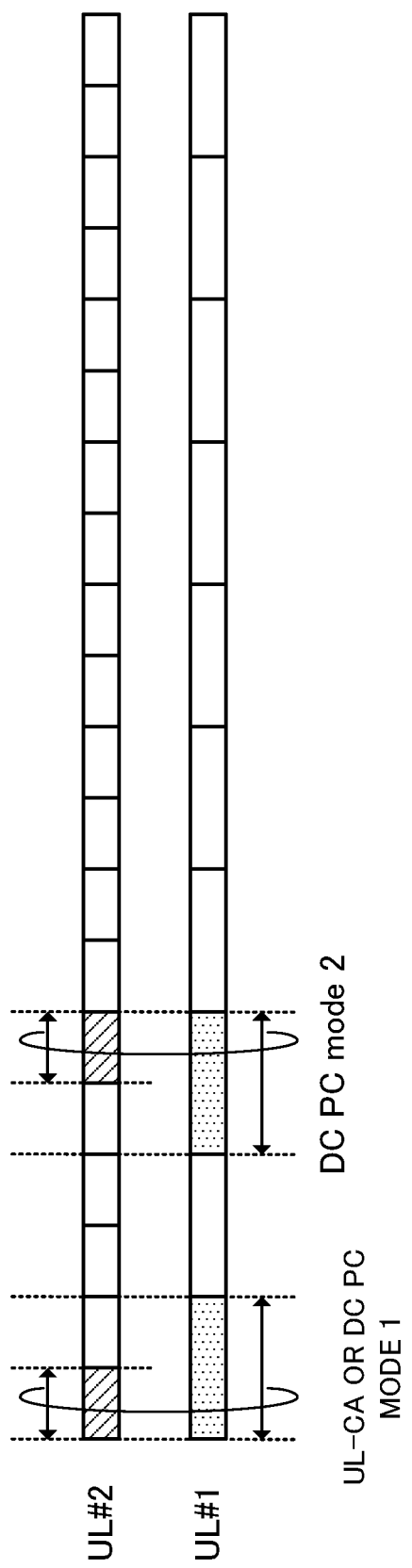
FIG. 7 is a diagram to show an example of UL transmission power control in the first embodiment.

FIG. 7 shows an example of a case in which UL transmission (UL-CA) is made using a first CC (UL #1) to which a first TTI duration (for example, one ms) is applied and a second CC (UL #2) to which a second TTI duration (for example, 0.5 ms) is applied. Here, assume the case where, between the two TTIs (subframes) of the second CC overlapping the TTIs (subframes) of the first CC, the transmission-starting timing of the first-half TTI matches the transmission-starting timing of the first CC's TTI.

When UL transmission is performed in the TTI of the first CC and the first-half TTI of the second CC separately, the user terminal determines the UL transmission power in each CC by applying UL-CA power control or by applying DC PC mode 1. In this case, the user terminal can determine the UL transmission power of each CC based on the channel type transmitted in each CC and/or the presence or the absence of uplink control information.

On the other hand, when UL transmission is performed in the TTI of the first CC and the second-half TTI of the second CC separately, the user terminal can determine the UL transmission power of each CC by applying DC PC mode 2. In this case, the user terminal can preferentially allocate transmission power to the first TTI (long TTI) of the first CC, where the transmission starting timing is earlier. Also, in the case where the CC groups are asynchronous (for example, when asynchronous DC is applied), a configuration in which DC PC mode 2 is applied may be adopted.

Thus, when multiple CC groups are configured according to the TTI durations of CCs, the configuration of UL transmission power is controlled based on the transmission starting timing, and this makes it possible to properly determine the UL transmission power even if UL transmission overlaps between CCs with different TTI durations.

Third Example

In a third example, a case where counter DAIs (C-DAIs) and/or total DAIs (T-DAIs) are applied to CC groups that are configured according to the TTI duration will be explained. First, counter DAIs and total DAIs will be explained below.

In existing systems (LTE Rel. 10 to 12), as mentioned earlier, the codebook size of HARQ-ACKs (ACK/NACK bit sequence) to be transmitted on the PUCCH is determined semi-statically based on information reported by higher layer signaling.

In the case of using FDD, the overall A/N bit size is determined based on the number of CCs configured by RRC signaling and the TM (Transmission Mode), which indicates whether MIMO (Multiple Input Multiple Output) is applicable in each CC. In a certain DL subframe, if a DL assignment is detected in at least one SCell, the user terminal feeds back A/Ns in all the CCs configured in the UL subframe a predetermined period later (for example, four ms later). Note that a NACK is generated for a cell where DL data assignment is not detected in the DL subframe (cell where PDSCH scheduling could not be identified).

When TDD is used, in addition to the above case using FDD, the overall size of the A/N bit sequence transmitted on the PUCCH is determined based on the number of DL subframes addressed by A/Ns per UL subframe. When the user terminal using TDD detects at least one DL assignment in the bundling window, the user terminal feeds back A/Ns for all the configured CCs using the PUCCH in the UL subframe a predetermined period later (for example, (n+k) ms later). Note that a NACK is generated for cells and/or subframes (cell/subframe where no scheduled PDSCH is identified) for which DL data assignment was not detected in the bundling window.

"Bundling window" refers to a group of DL subframes subject to A/N feedback in a certain UL subframe (including special subframes). The bundling window is specified by the UL/DL configuration of TDD. A user terminal that communicates using TDD is controlled to transmit an A/N for a DL signal transmitted in a predetermined subframe in a predetermined UL subframe based on the bundling window.

For example, suppose a case where four DL subframes are included in the bundling window corresponding to a certain UL sub frame and one DL subframe is scheduled among the four DL subframes (when the user terminal detects one DL assignment). In this case, the user terminal uses this UL subframe to feed back the A/Ns for all the CCs that are configured via the PUCCH. That is, the user terminal controls the transmission of the A/N bit sequence based on the information reported by higher layer signaling regardless of the number of CCs to be scheduled and the number of subframes.

In this way, when the user terminal determines the bit size of A/Ns to feed back based on information reported by higher layer signaling, the situation might arise where the A/N bit size does not match the number of CCs actually scheduled.

As stated above, in LTE Rel. 13 and later, it is assumed that the restriction on the number of CCs that can be configured in a user terminal is relaxed and six or more CCs are configured. When the number of CCs to be configured is expanded, it is possible that the gap between the number of CCs configured and the number of CCs scheduled in each subframe increases.

Figure 8:
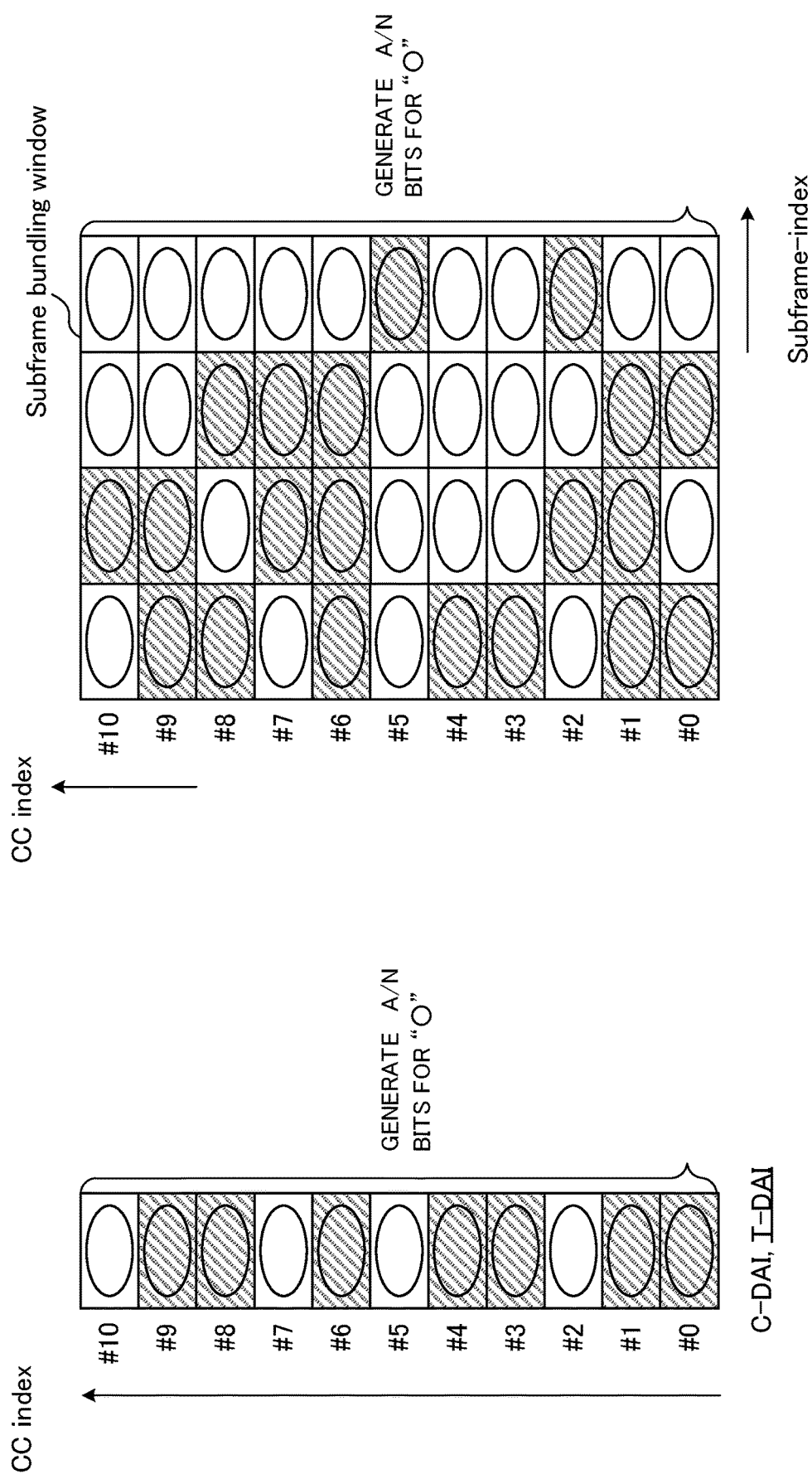
FIG. 8A and FIG. 8B are diagrams to show examples of A/N bit generation in existing systems.

Assume, for example, a case where the user terminal is configured with CC #0 to CC #10 (see FIG. 8). When some of the CCs (CC #0, #1, #3, #4, #6, #8 and #9) are scheduled in a given subframe (for example, FDD), in existing systems, the A/N bit size to allocate to the PUCCH is determined based on the number of all CC regardless of the number of scheduled CCs (see FIG. 8A). The user terminal feeds back NACKs for unscheduled CCs.

Similarly, if the bundling window contains four DL subframes (for example, TDD), in existing systems, the A/N bit size to allocate to the PUCCH is determined based on the number of all CC regardless of the number of CC scheduled in each subframe (see FIG. 8B).

As described above, when the number of CCs to be configured is expanded, it is possible that the gap between the number of CCs configured and the number of CCs scheduled in each subframe increases. If the number of CCs where DL signals are scheduled is less than the number of CCs to be configured and the codebook size is determined semi-statically as in conventional cases, this leads to the situation where most of the ACKs/NACKs transmitted from the user terminal are NACKs.

In general, the smaller the A/N codebook size, the smaller the amount of information that the user terminal transmits. Therefore, if the A/N codebook size can be reduced, the quality of communication (SINR: Signal to Interference plus Noise Power Ratio) required in radio transmission can be kept low. Therefore, it is effective to make it possible to dynamically change the codebook size of A/Ns that the user terminal feeds back, according to the number of CCs that are scheduled (and the number of subframes).

To allow the user terminal to accurately identify the scheduled CCs and subframes and adaptively control the A/N codebook size based on the number of scheduled CCs and subframes, it may be possible to use a DL assignment index (DAI: Downlink Assignment Indicator/Index). For example, the radio base station includes DAIS in the downlink control information (DL assignment) of each CC to be scheduled in a given subframe, and transmits it to the user terminal. DAIS are values assigned to every scheduled cell and used to indicate the number of scheduling CCs (the accumulative number of CCs, the count value, etc.).

When DL signals of a plurality of CCs are detected in a given subframe, if the values of DAIS included in the downlink control information of each CC are not consecutive, the UE can judge the UE has failed to detect the CC corresponding to the undetected DAI. In this way, by using DAIS, it is possible to match the recognition of the A/N codebook size between the user terminal and the radio base station and to appropriately identify the CCs that the user terminal has failed to detect.

However, the present inventors have found out that, even when DAIS are used, if the user terminal fails to detect the cell in which the DAI included in the downlink control information is the largest among the scheduled cells, the user terminal is unable to recognize this detection failure. For this reason, it is effective that the radio base station reports information on the number of CCs scheduled in downlink control information, to the user terminal. That is, it is effective that the radio base station includes information that is used to count scheduling CCs and information to indicate the number of scheduling CCs (total number), in the downlink control information of each CC, and reports this downlink control information to the user terminal. The information used to count scheduling CCs is also referred to as "counter DAIs," and the information to indicate the number of scheduling CCs is also referred to as "total DAIs."

Figure 9:
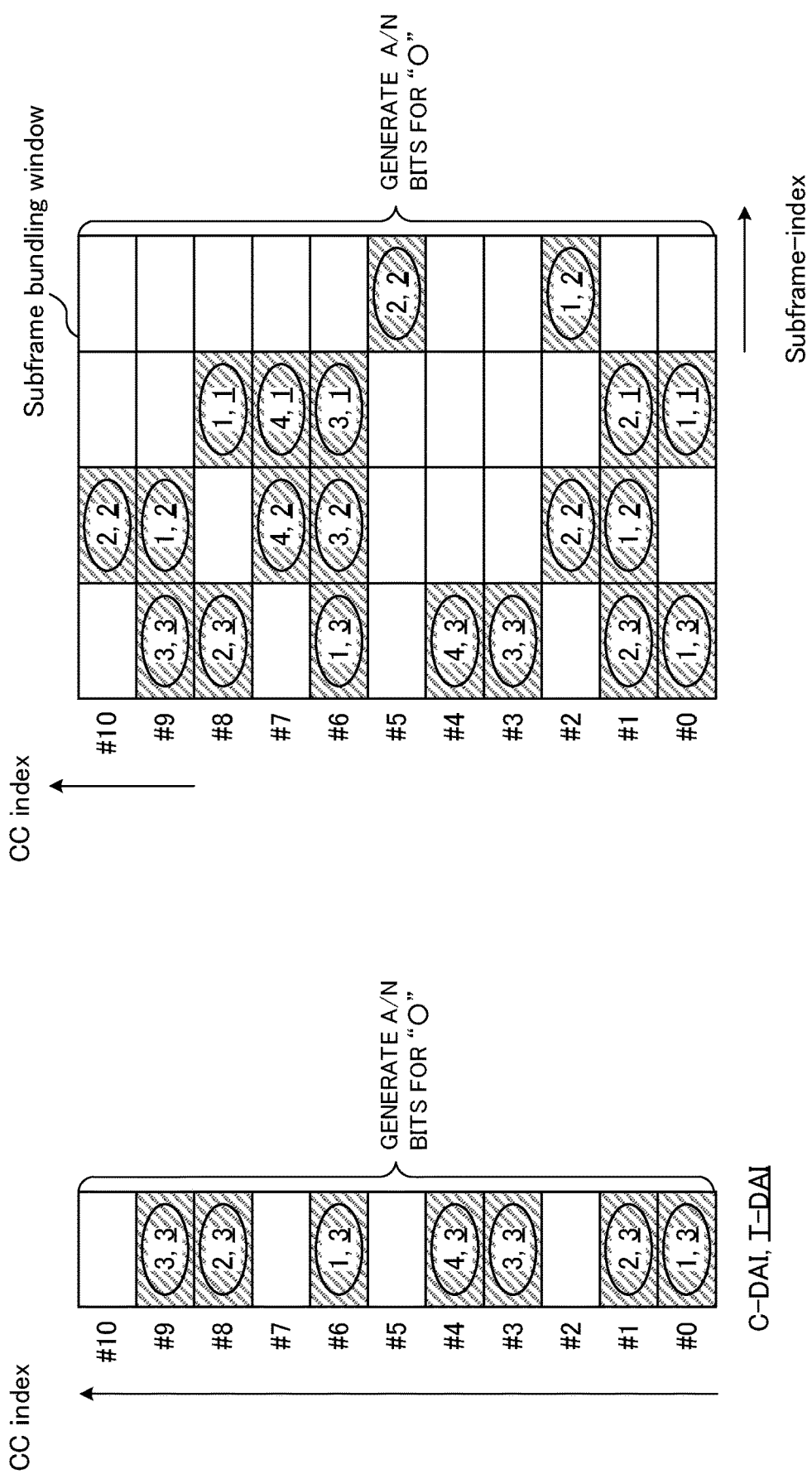
FIG. 9A and FIG. 9B are diagrams to show examples of A/N bit generation using counter DAIs and total DAIs.

For example, assume that CC #0 to CC #10 are configured on the user terminal (see FIG. 9). When part of the CCs (CC #0, #1, #3, #4, #6, #8 and #9) are scheduled in a given subframe, the radio base station configures counter DAIs in the downlink control information of the scheduling CCs, and also configures total DAIs (see FIG. 9A)). Here, a case is shown where the counter DAIs and the total DAIs are each represented by two bits. Consequently, the counter DAIs corresponding to CC #0, #1, #3, #4, #6, #8 and #9 are configured as "1, 2, 3, 4, 1, 2 and 3." Also, since the number of scheduled CCs is seven, the total DAI is configured to "3."

The user terminal can identify the CCs where the user terminal has failed to detect the DL signals (for example, DL assignments) based on the counter DAIs, and recognize the detection failure of the last CC based on the total DAI.

Also, when four DL subframes are included in the bundling window (for example, TDD), for each subframe, the radio base station configures counter DAIs in the downlink control information of the scheduling CCs and configures total DAIs (see FIG. 9B). Note that when multiple subframes are included in the bundling window, the radio base station can configure counter DAIs and total DAIs for the scheduled CCs, on a per subframe basis. Alternatively, counter DAIs and/or total DAIs may be configured for CCs scheduled over multiple subframes. For example, counter DAIs may be configured over multiple subframes in the bundling window and total DAI may be configured on a per subframe basis.

Also, control may be exerted by switching between the method of controlling the number of A/N bits using counter DAIs and total DAIs (see FIG. 9) and the method of controlling the number of A/N bits based on the number of CCs configured in existing systems (see FIG. 8). In this case, the radio base station may be configured to report which control method is used, to the user terminal, by using higher layer signaling or the like.

Thus, when the number of A/N bits is controlled using counter DAIs and total DAIs, as shown in FIG. 6, the question is how to apply counter DAIs and/or total DAIs to the CC groups configured according to TTI durations.

Therefore, the present inventors have come up with the idea of separately applying counter DAIs and/or total DAIs, for each CC group with a different TTI duration. In the example shown in FIG. 10, counter DAIs and total DAIs are independently controlled in the first CC group formed with CCs of the first TTI duration and the second CC group formed with CCs of the second TTI duration.

FIG. 10 shows an example in which counter DAIs and total DAIs are applied to each CC group. In the first CC group, DL transmission in CC #1 to CC #4 is scheduled in first TTI # n (normal SF # n). Different counter DAIs (here, 1, 2, 3, and 4) and a common total DAI (here, 4) are included in the downlink control information of CC #1 to CC #4, and the downlink control information is reported from the radio base station to the user terminal.

The user terminal feeds back A/Ns at the timing a predetermined period later (for example in first TTI # n+4) based on the reception result in first TTI # n. In this case, the user terminal can identify the CCs which have failed to be detected, considering the counter DAIs and the total DAI, and determine the A/N code book size.

Also, in the first CC group, in first TTI # n+1 (normal SF # n+1), DL transmissions in CC #3 and CC #4 is scheduled. The radio base station includes different counter DAIs (here, 1 and 2) and a common total DAI (here, 2) in the downlink control information of CC #3 and CC #4 and reports the downlink control information to the user terminal.

The user terminal feeds back A/Ns at the timing a predetermined period later (for example in first TTI # n+5) based on the reception result in first TTI # n+1.

On the other hand, in second TTI # m (shortened SF # m) in the second CC group, DL transmission in CC #5, #6, and #8 is scheduled. The radio base station includes different counter DAIs (here, 1, 2, 3) and a common total DAI (here, 3) in the downlink control information of CCs #5, #6, and #8 and reports the downlink control information to the user terminal.

The user terminal feeds back A/Ns at the timing a predetermined period later (for example in second TTI # m+4) based on the reception result in second TTI # m. In this case, the user terminal can identify the CCs which have failed to be detected, and can determine the A/N codebook size, considering the counter DAIs and the total DAI.

In the second CC group, in second TTI # m+1 (shortened SF # m+1), DL transmission in CC #6 and CC #7 is scheduled. The radio base station includes different counter DAIs (here, 1 and 2) and a common total DAI (here, 2) in the downlink control information of CC #6 and CC #7, and reports the downlink control information to the user terminal. The user terminal feeds back A/Ns at the timing a predetermined period later (for example, in second TTI # m+5) based on the reception result in second TTI # m+1. Second TTIs # m and # m+1 correspond to first TTI # n.

In this way, by individually applying counter DAIs and/or total DAIs per CC group with a different TTI duration, CCs that have failed to be detected can be appropriately identified for each CC group, and the A/N codebook size can be determined. By this, it is possible to properly control the feedback of A/Ns on a per CC group basis.

Further, the radio base station can be configured to simultaneously configure the user terminal to apply counter DAIs and total DAIs to a plurality of CC groups (here, the first CC group and the second CC group). Alternatively, the radio base station may be configured to independently configure the application of counter DAIs and total DAIs, per CC group, in the user terminal. By this, it is possible to flexibly control whether or not to configure counter DAIs and total DAIs, on a per CC group basis.

Second Embodiment

In a second embodiment, a case will be explained in which CCs with different TTI durations are configured in the same CC group. In the following description, it is shown that one CC group is configured, but the number of CC groups and the number of CCs forming each CC group are not particularly limited. In addition, each CC can use FDD or TDD as appropriate. In the following description, examples of UL transmission control (for example, transmission timing) for A/Ns will be described, but the present embodiment can be applied to other UL transmissions as well.

First Example

Figure 11:
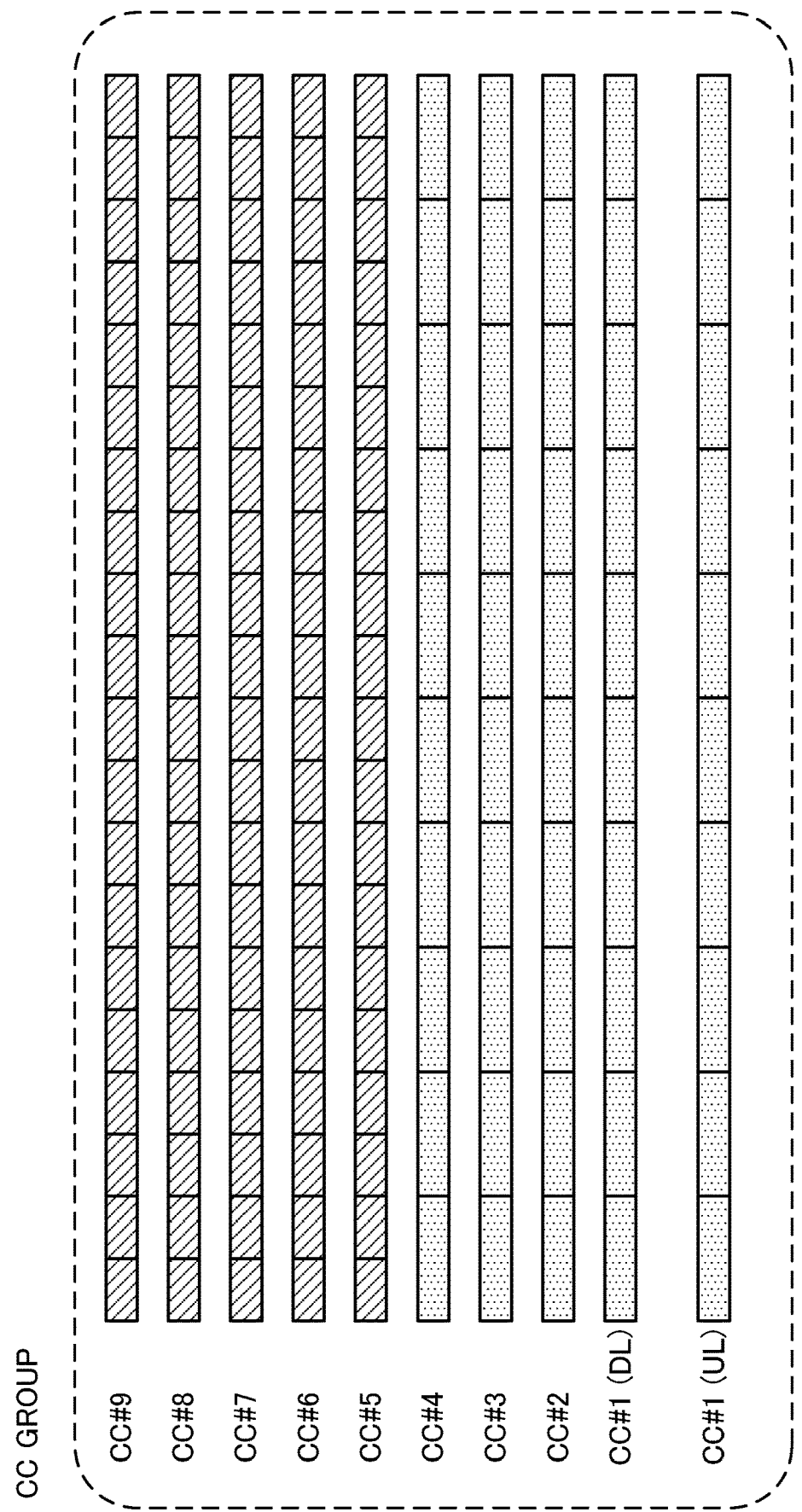
FIG. 11 is a diagram to show an example of a CC group in a second embodiment.

FIG. 11 shows an example in which CCs (cells) to be transmitted and received using different TTI durations are included in the same CC group.

Here, when CC #1 to CC #4, to which the first TTI duration is applied, and CC #5 to CC #9, to which the second TTI duration is applied, form one CC group. In this case, uplink control information and the like for the CCs of the second TTI duration can be transmitted using a UL channel (for example, uplink control channel) of a predetermined CC of the first TTI duration.

In this way, by including CCs with different TTI durations in the same CC group and controlling scheduling and/or HARQ timing for each CC group, UL transmission (for example, UL transmission using the PUCCH) can be performed using one CC. In this case, unlike when CC groups are configured according to TTI durations (first embodiment), UL transmission by multiple CCs (for example, two CCs) is no longer necessary, so that it is possible to simplify the implementation of the user terminal.

Also, the TTI duration of each CC included in a CC group can be included in higher layer signaling such as RRC signaling, which reports configuration and reconfiguration of each CC.

When DC is applied, this higher layer signaling may be transmitted and received only from the CCs belonging to the MCG. When DC is applied, the user terminal may communicate with different radio base stations between the MCG and SCGs. To realize this, backhaul signaling may be introduced, in which the MeNB controlling the MCG and the SeNB controlling the SCG report the TTI duration of each CC included in each cell group to each other. For example, signaling may be introduced in which the MeNB specifies to the SeNB the TTI duration which the user terminal uses when communicating with the each CC of the SCG. This allows the SeNB to recognize the TTI duration used by the user terminal when communicating with the each CC of the SCG, which is configured in the user terminal by the MeNB via higher layer signaling, so that the SeNB can properly communicate with the user terminal.

Signaling may also be introduced in which one or more TTI durations which the user terminal can use when communicating with each CC of the SCG are reported from the SeNB to the MeNB. As a result, the MeNB can recognize the TTI duration that each CC of the SeNB can use for communication with the user terminal, and the MeNB can select an appropriate TTI duration out of the TTI durations that the SeNB can use in each CC for communication and configure it in the user terminal. If TTI durations that can be used when the user terminal communicates with each CC of the SCG are not reported from SeNB to MeNB, the MeNB may recognize that the 1-ms normal TTI, specified in conventional LTE, is the only TTI duration that can be configured in each CC of the SeNB.

In configurations where CCs with different TTI durations are included in the same CC group, control may be performed so that the scheduling and/or HARQ timing vary depending on the TTI duration of the CC (or TTI duration of subframe). In the case shown in FIG. 12, in first TTI # n (normal SF # n), A/N feedback for DL transmission of CC #1 to CC #4 and/or uplink data for UL grant of CC #1 to CC #4 are transmitted in first TTI # n+4 (SF # n+4). When an A/N is not transmitted at the same time with UL data (PUSCH), it is transmitted on the uplink control channel of a predetermined CC, and, when an A/N is transmitted simultaneously with UL data, it can be included in the UL data and transmitted.

On the other hand, in the case shown here, in second TTI # m, A/N feedback for the DL transmission of CC #5 to CC #9 and/or uplink data for UL grants of CC #5 to CC #9 are transmitted in first TTI # n+2 (SF # n+2). Here, two second TTIs correspond to the first TTI (here, second TTI # m and # m+1 correspond to first TTI # n).

That is, the user terminal sets the timing to transmit an A/N in response to DL data of a shortened TTI (second TTI) earlier than the timing to transmit an A/N (for example, four ms later) in response to DL data of a normal TTI (first TTI). Further, the user terminal transmits the UL data transmission timing in response to a UL grant received in a CC of a shortened TTI (second TTI) earlier than the timing to transmit UL data (for example, four ms later) in response to a UL grant received in a CC of a normal TTI (first TTI). As a result of this, even if CCs with different TTI durations are included in the same CC group, scheduling and/or HARQ timing can be controlled according to TTI durations. As a result, delay of UL transmission can be suppressed.

Figure 12:
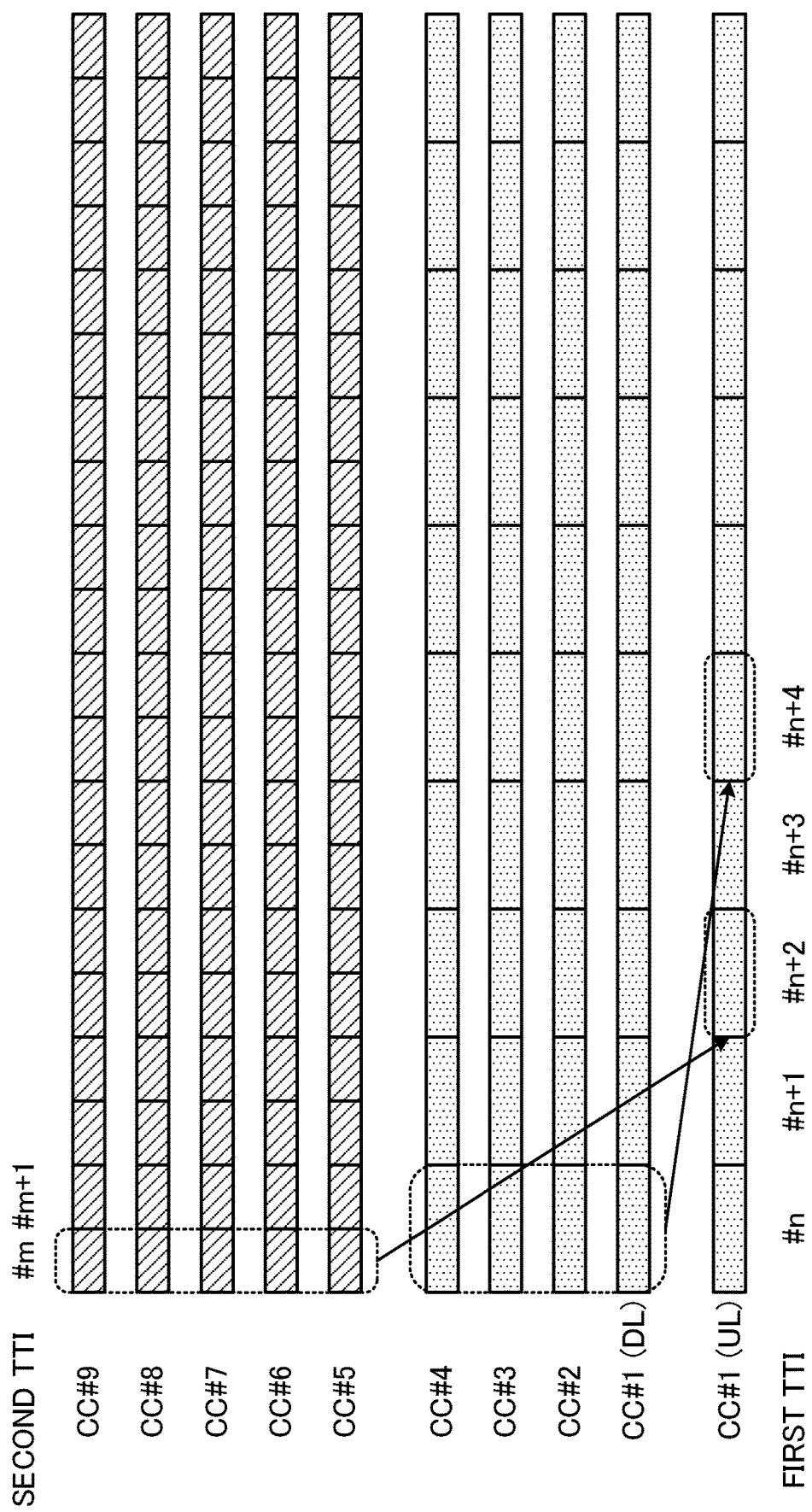
FIG. 12 is a diagram to show examples of UL transmission timings in the second embodiment.
Figure 13:
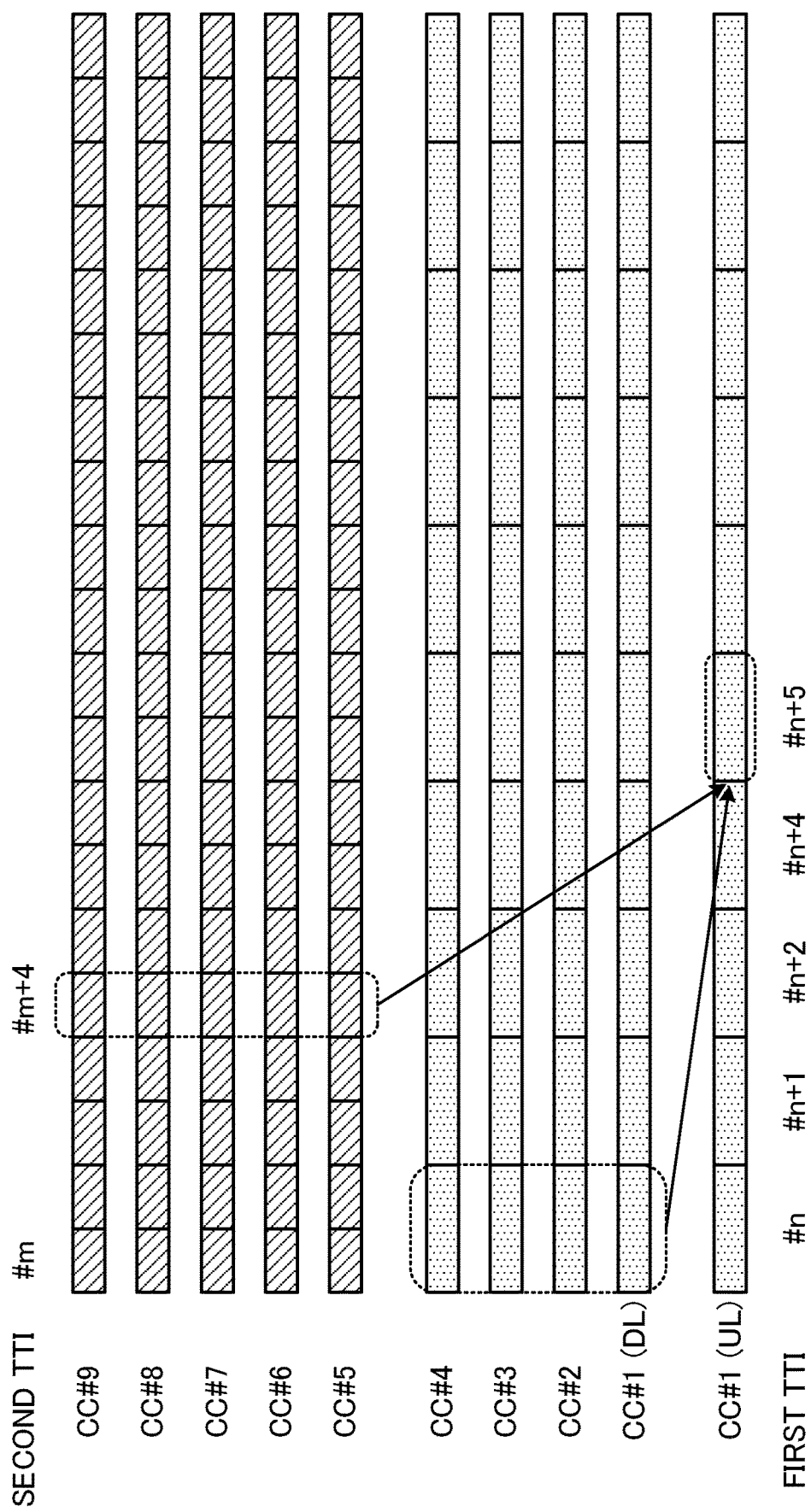
FIG. 13 is a diagram to show other examples of UL transmission timings according to the second embodiment.

As shown in FIG. 12, when A/Ns for DL data scheduled at the same timing are not fed back at the same time among CCs with different TTI durations, it is possible to simultaneously transmit A/Ns in response to DL data scheduled at different timings (see FIG. 13).

For example, A/Ns in response to DL data scheduled in CC #1 to CC #4 in first TTI # n and A/Ns in response to DL data scheduled in CC #5 to CC #9 in second TTI # m+4 can be fed back at the same timing. In this case, A/Ns in response to DL data of CCs with different TTI durations can be multiplexed in an uplink control channel of a predetermined CC (here, CC #1) and transmitted.

Figure 14:
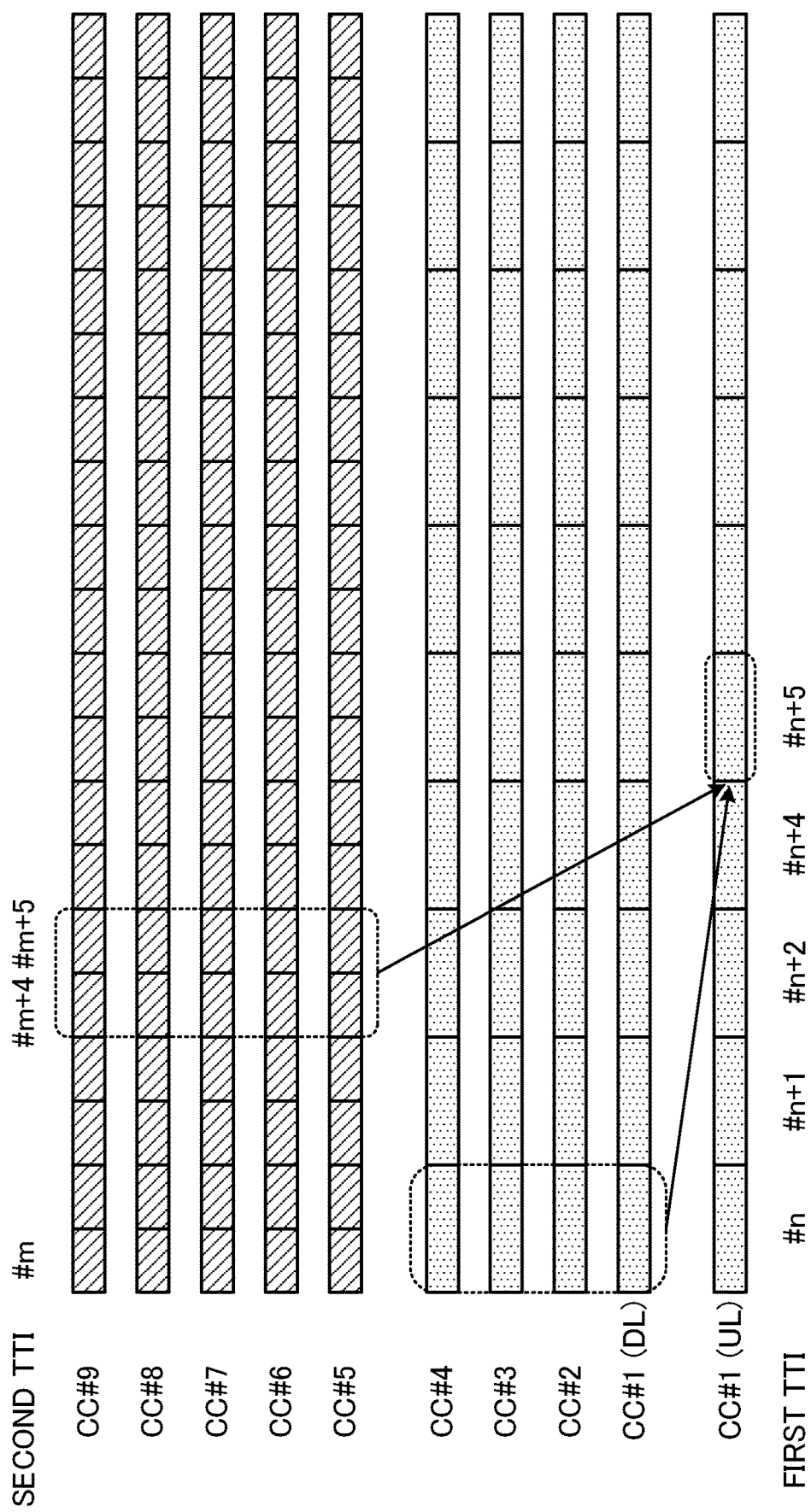
FIG. 14 is a diagram to show other examples of UL transmission timings according to the second embodiment.

Also, control may be performed so that multiple shortened TTIs (here, second TTIs) are fed back using one UL transmission (in this case, UL transmission in CC #1) (see FIG. 14). For example, the user terminal can perform UL transmission in a number of shortened TTIs corresponding to one normal TTI (first TTI) at once. In the case shown in FIG. 14, the user terminal performs UL transmission (for example, A/N) for the two shortened TTIs of second TTI # m+4 and # m+5 using a predetermined CC. As the predetermined CC, it is possible to use a CC (CC #1) of a normal TTI that is longer than the shortened TTI.

Also, the PUCCH resource to use for A/N feedback may be specified in a second TTI closer to the PUCCH transmission timing. That is, the UE can determine the PUCCH resource used for A/N feedback based on the DL control signal in the TTI closest to the PUCCH transmission timing. In this case, the radio base station can update the PUCCH resource specified in the DL scheduling timing of the first TTI at the scheduling timing of the second TTI in which A/N feedback is sent using the same PUCCH resource, so that the flexibility of control by the scheduler can be improved.

Second Example

As shown in FIG. 13, between CCs with different TTI durations, when the scheduling and/or HARQ timing are controlled based on the TTI duration of CCs, it may be possible to simultaneously transmit A/Ns in response to DL data scheduled at different timings. In this case, how to apply counter DAIs and/or total DAIs is the problem. Hereinafter, an example of a counter DAI and/or a total DAI application method in the second embodiment will be described. In the following description, it is shown that the counter DAIs and total DAIs are each 2 bits, but the present embodiment is not limited to this.

Figure 15:
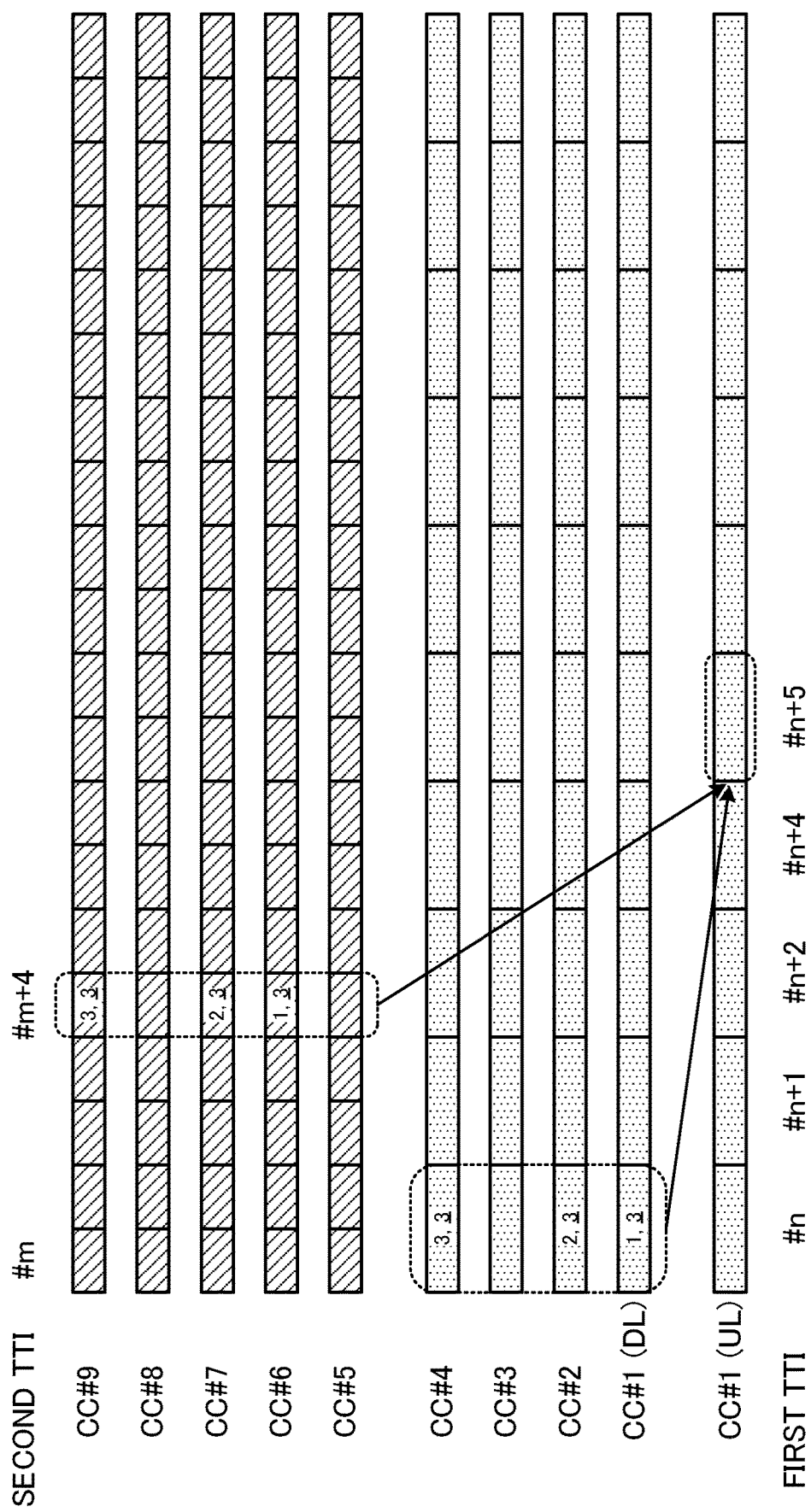
FIG. 15 is a diagram to show an example of a method for configuring counter DAIs and total DAIs according to the second embodiment.

When CA is performed in CCs with different TTI durations, counter DAIs and/or total DAIs can be applied individually between CCs of the same TTI duration. As an example, counter DAIs that continuously count up can only be applied between CCs with the same TTI duration (see FIG. 15). In FIG. 15, for CC #1, #2, and #4 scheduled in first TTI # n and CC #6, #7, and #9 scheduled in second TTI # m+4, counter DAIs are individually configured. Likewise, total DAIs can also be independently configured be between CCs of the same TTI durations (between CCs where counter DAIs are configured).

In this case, the counter DAIs of TTIs which are temporally different become discontinuous. The user terminal identifies the A/N and A/N bit sequence of each CC based on the counter DAIs and total DAIs configured for each TTI duration, and controls the feedback. Note that the control unit of counter DAIs and total DAIs is not limited to the TTI duration of CCs.

Figure 16:
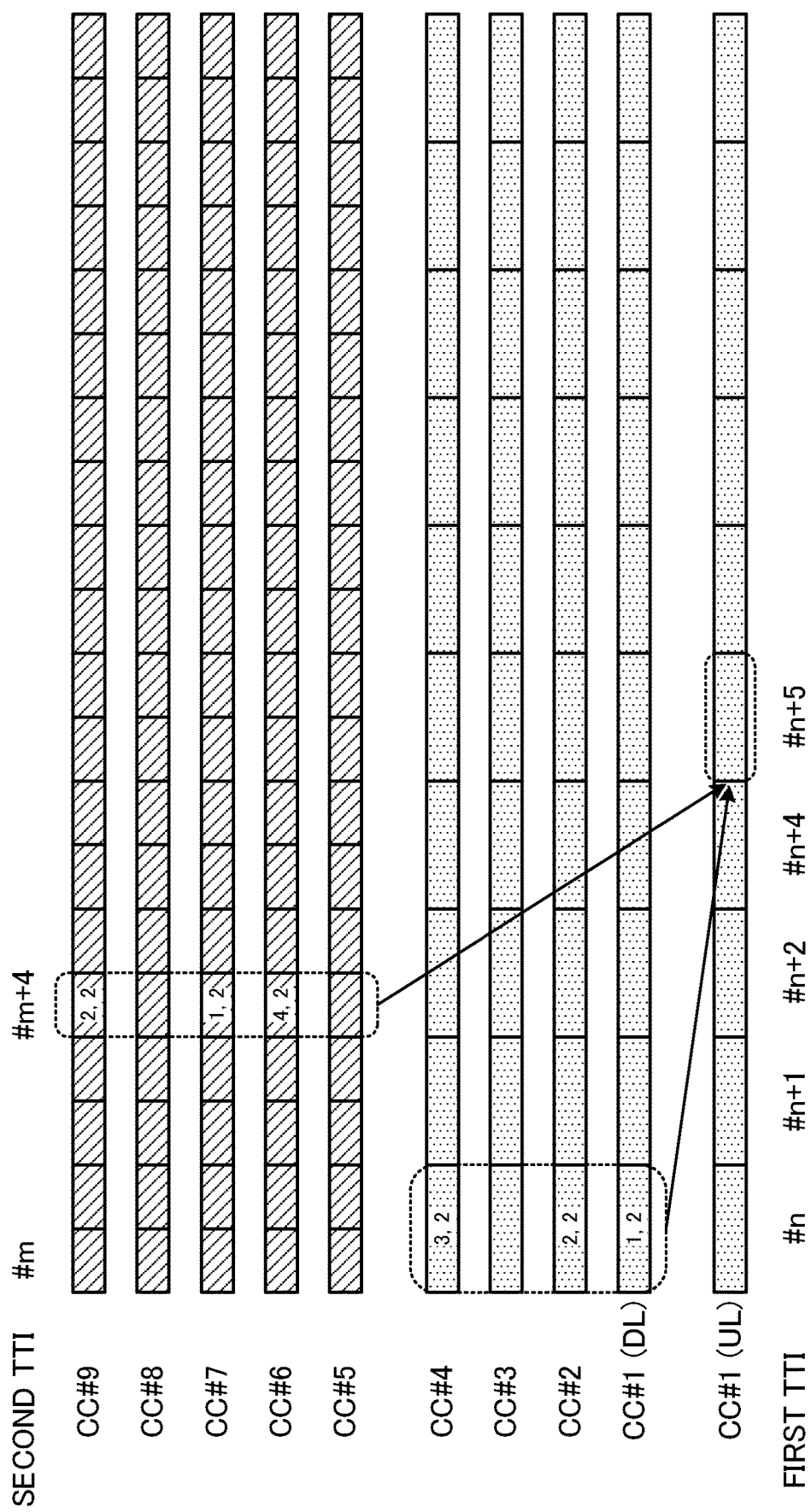
FIG. 16 is a diagram to show another example of a method of configuring counter DAIs and total DAIs according to the second embodiment.

Alternatively, control can be performed so that counter DAIs continuously count up between CCs that belong to the same CC group but have different TTI durations (see FIG. 16). In FIG. 16, continuous counter DAIs are configured in CC #1, #2, and #4 scheduled in first TTI # n and CC #6, #7, and #9 scheduled in second TTI # m+4. Likewise, total DAIs can also be configured considering the total number of scheduling CCs (here, 6) between CCs with different TTI durations.

When consecutive counter DAIs are configured between different TTIs in time, counter DAIs can be configured that count up in order from the CC of the earliest timing (for example, scheduling timing). Alternatively, it is possible to determine the order of counting up based on the TTI duration of CCs (for example, CCs with longer TTI durations can be given priority)). If the scheduling timing and/or the TTI duration are the same between CCs, the order of counting up may be determined based on the CC indices, etc.

Also, as shown in FIG. 14, when multiple shortened TTIs are subject to feedback using one UL transmission, the counter DAIs and/or total DAIs can be configured based on the TTI duration and/or scheduling timing of the CCs.

Figure 17:
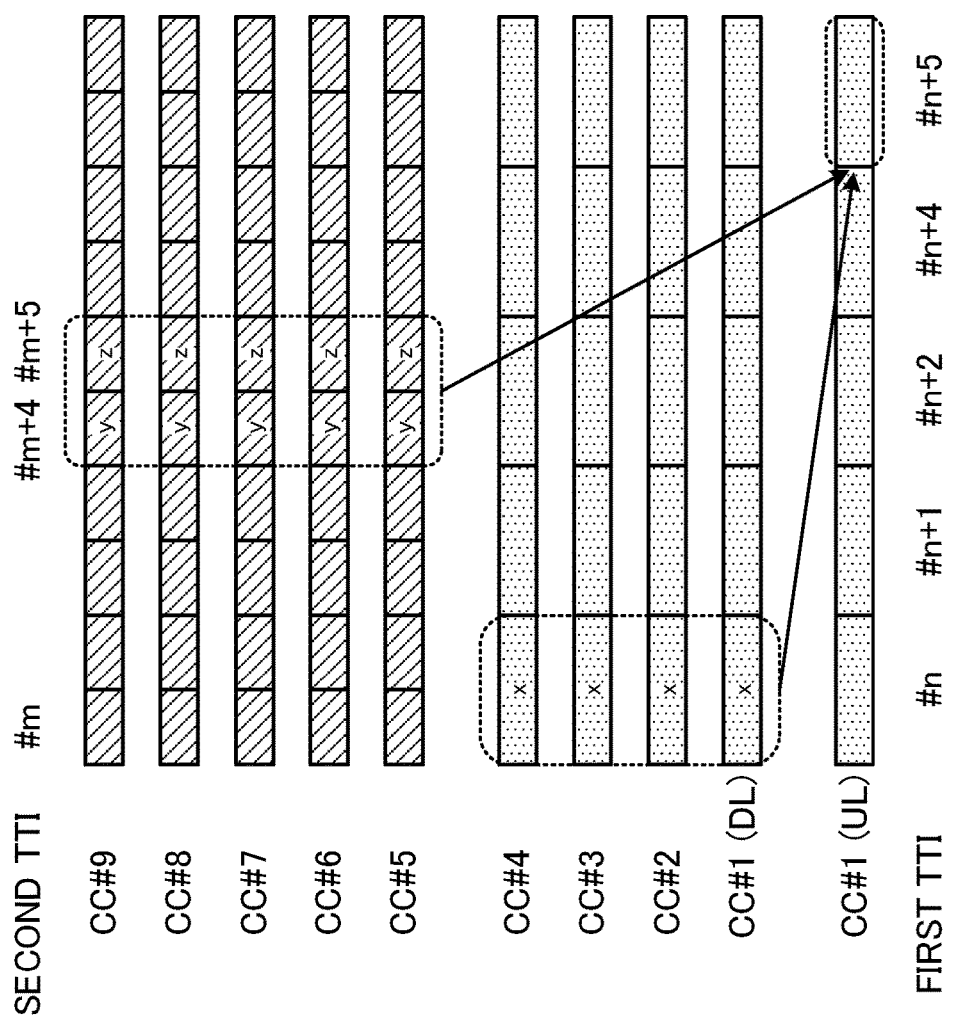
FIG. 17 is a diagram to show another example of a method of configuring counter DAIs and total DAIs according to the second embodiment.

In the case shown in FIG. 17, counter DAIs and total DAIs are individually controlled for each CC having a different scheduling timing. In particular, in CCs scheduled in first TTI # n, CCs scheduled in second TTI # m+4, and CCs scheduled in second TTI # m+5, independent total DAIs are configured. Counter DAIs can be configured likewise. By doing this, A/Ns and so on can be judged on a per TTI basis.

Figure 18:
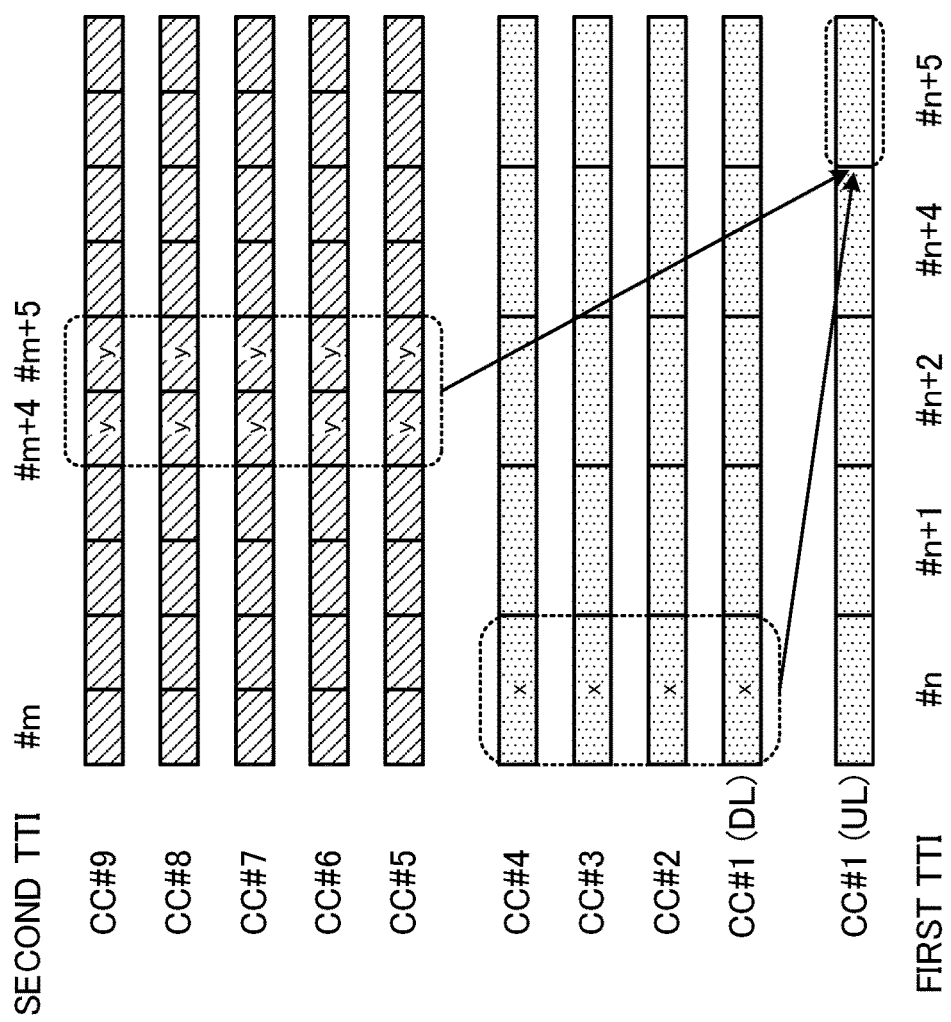
FIG. 18 is a diagram to show another example of a method of configuring counter DAIs and total DAIs according to the second embodiment.

FIG. 18 shows the case where counter DAIs and total DAIs are individually controlled for each CC with a different TTI duration. To be more specific, independent total DAIs are configured in a CC scheduled in the first TTI and a CC scheduled in the second TTI. Counter DAI can be configured likewise. That is, consecutive counter DAIs are configured in second TTI # m+4 and # m+5 that perform UL transmission at the same timing. Also, total DAIs are configured based on the number of CCs scheduled in second TTI # m+4 and # m+5. With this, it is possible to judge A/Ns and so on for CCs having the same TTI duration based on one type of counter DAI and total DAI.

Figure 19:
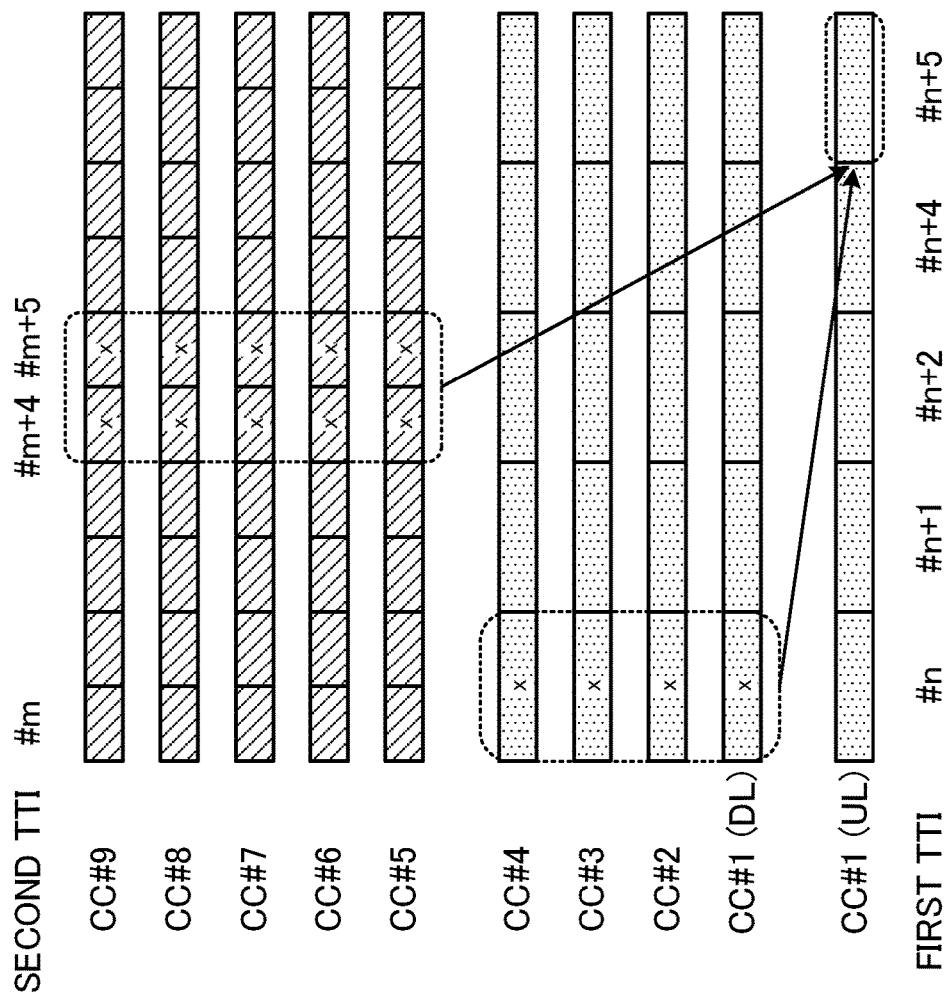
FIG. 19 is a diagram to show another example of a method for configuring counter DAIs and total DAIs according to the second embodiment.

In the case shown in FIG. 19, regardless of the TTI duration of CCs or the scheduling timing, Counter DAIS and total DAIS are configured for CCs that perform UL transmission at the same CC and/or timing. To be more specific, continuous counter DAIS are configured among the CCs scheduled in first TTI # n, the CCs scheduled in second TTI # m+4 and the CCs scheduled in second TTI # m+5. Also, total DAIS are configured based on the number of CCs scheduled in first TTI # n, second TTI # m+4, and second TTI # m+5). As a result of this, regardless of the TTI duration of CCs, it is possible to judge A/Ns and so on for CCs that carry out UL transmission at the same time based on one type of counter DAI and total DAI.

Figure 20:
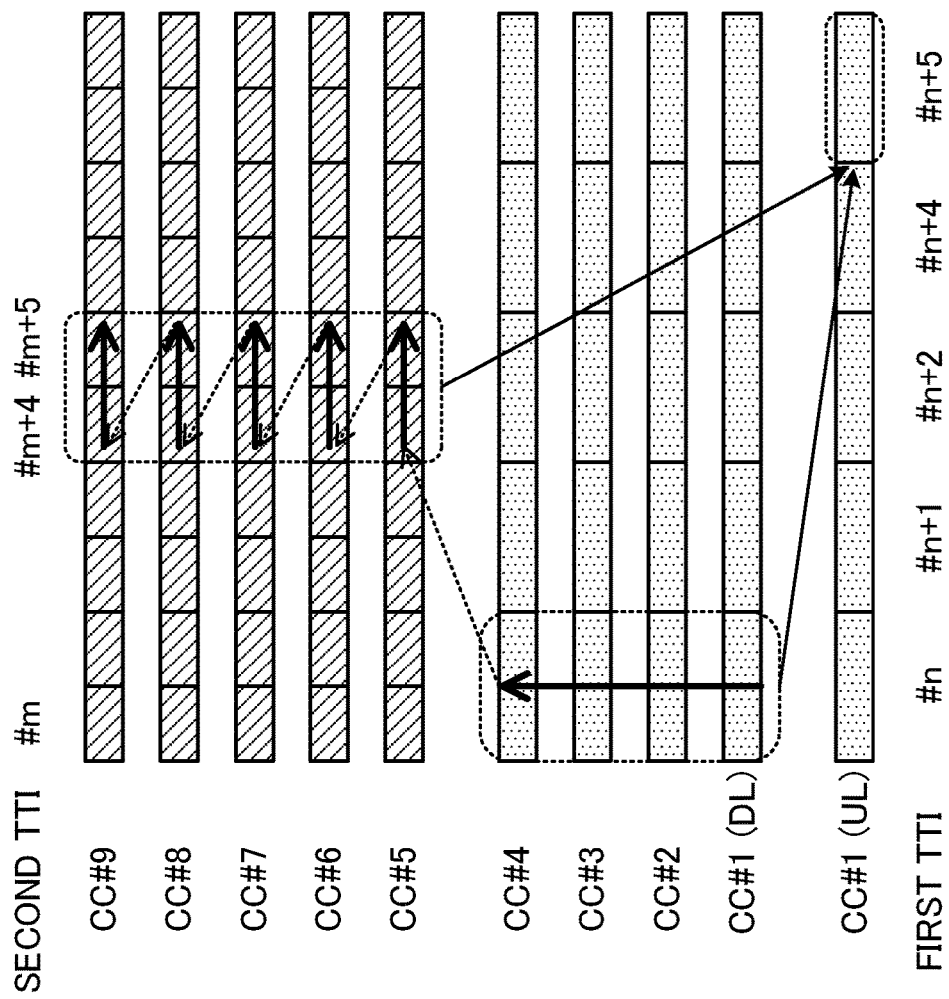
FIG. 20 is a diagram to show another example of a method of configuring counter DAIs and total DAIs according to the second embodiment.
Figure 21:
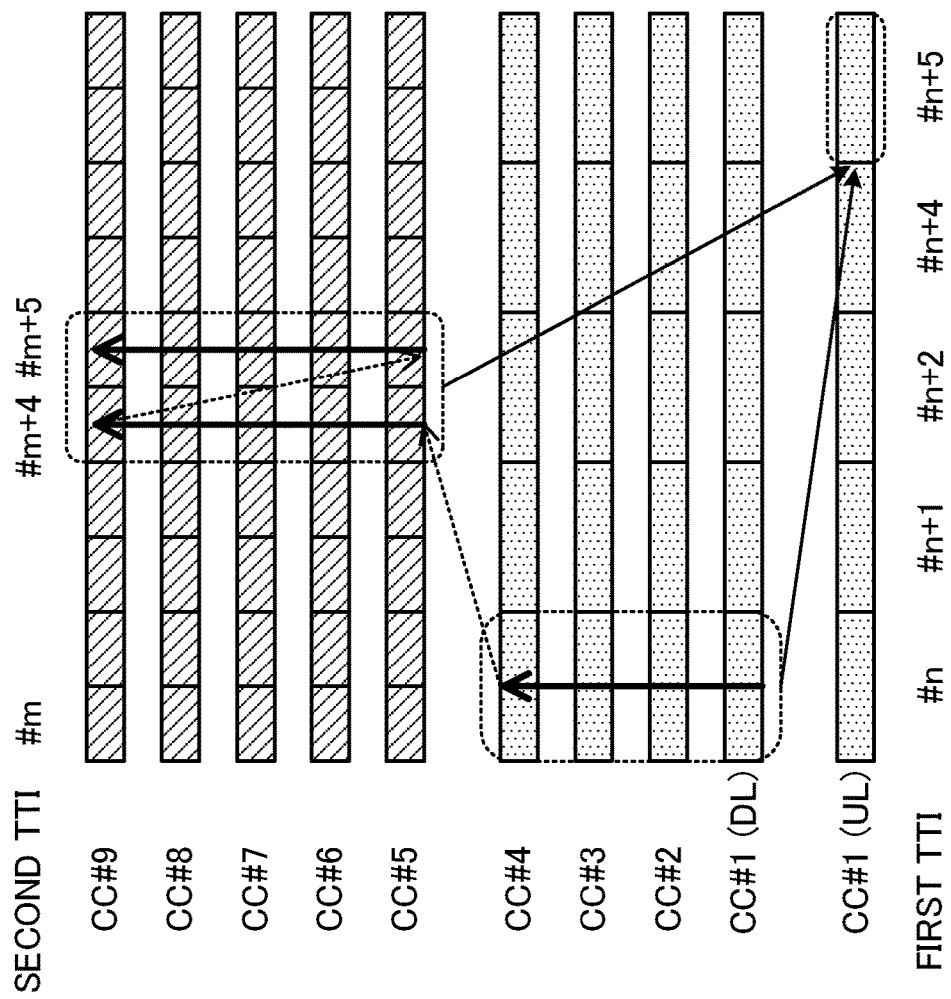
FIG. 21 is a diagram to show another example of a method of configuring counter DAIs and total DAIs according to the second embodiment.

Also, in the case where continuous counter DAIS are configured in CCs that have the same TTI duration but have different timings (CCs scheduled in second TTI # m+4 and # m+5, in this case) the count-up order of the counter DAIS can be appropriately configured (see FIG. 18 and FIG. 19). For example, it is possible that counter DAIS count up in the CC direction after counting up in multiple shortened TTI directions (time direction) (see FIG. 20)). Alternatively, counter DAIS may count up in the CC direction and then count up in the TTI direction (see FIG. 21). Also, when continuous counter DAIS are configured between CCs with different TTI durations (FIG. 19), it is possible to count up sequentially from the CC with the earliest scheduling timing (or the CC with the longest TTI duration).

Note that the method of applying counter DAIS and total DAIS is not limited to the method shown in FIGS. 17 to 19). For example, it is possible to configure counter DAIS and total DAIS by considering the CCs scheduled in first TTI # n and the CCs scheduled in second TTI # m+4. On the other hand, apart from this, a configuration in which counter DAIs and total DAIs are configured in consideration of the CCs scheduled in second TTI # m+5 may be used. This configuration corresponds to a configuration in which "y" in second TTI # m+4 in FIG. 18 is replaced by "x."

Thus, when a CC group is formed with CCs with different TTI durations, by applying counter DAIs and/or total DAIs, A/N transmission in response to CCs with different TTI durations can be performed appropriately.

Third Example

In the third example, the capability information (UE capability signaling) reported from the user terminal to the radio base station when CCs (cells) that transmit and receive in different TTI durations are included in the same CC group will be explained.

Figures 22A, 22B:
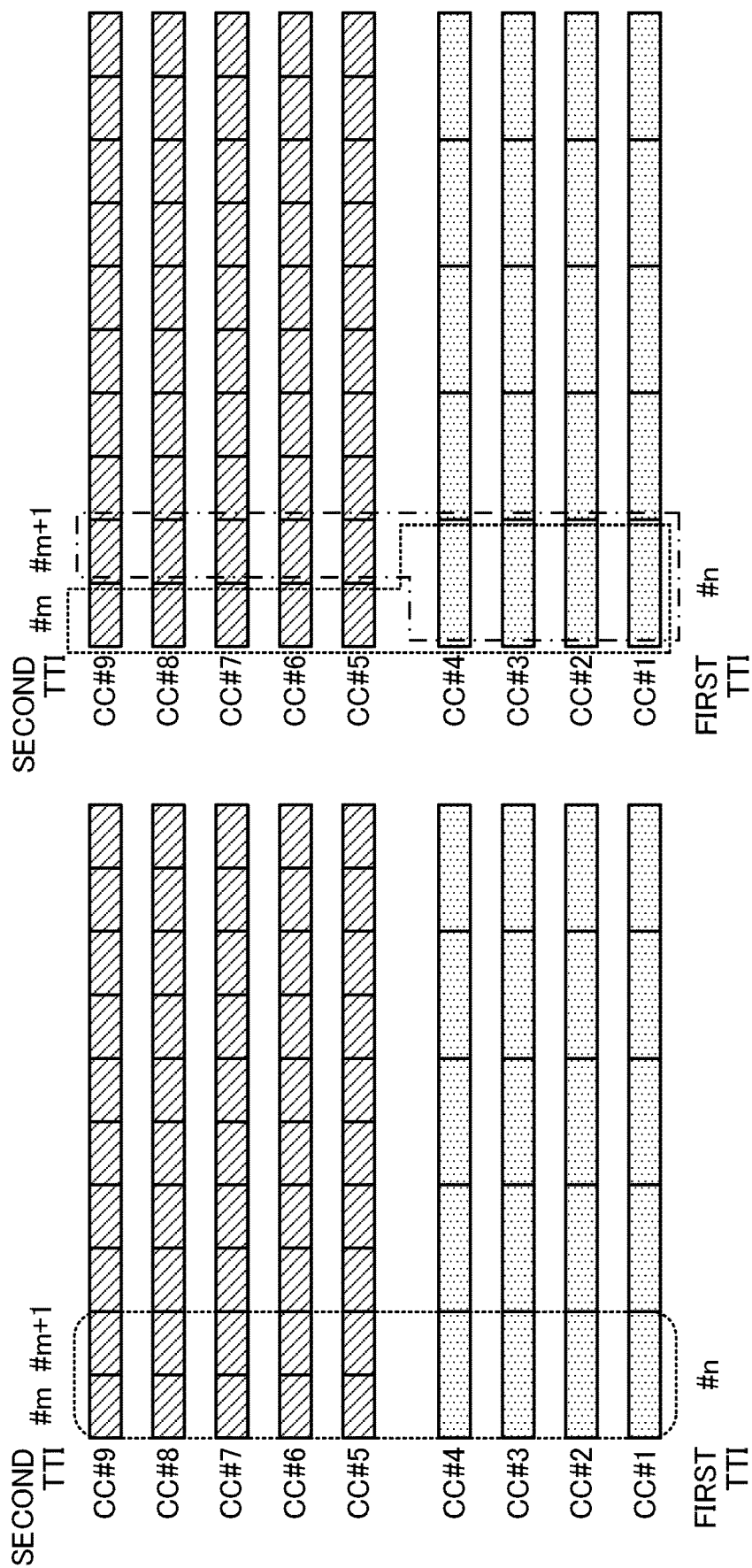
FIG. 22A and FIG. 22B are diagrams to show examples of UE capability information in the second embodiment.

User terminals that support CA and/or DC that bundle CCs of different TTI durations can report, to the radio base station, information about the size that can be transmitted and received over all TTIs included in the normal TTI (first TTI) period and/or the number of times of blind decoding of a downlink control channel (see FIG. 22A). For example, in FIG. 22A, the user terminal reports capability information, taking into account CC #1 to CC #4 in the first TTI # n period and CC #5 to CC #9 in the second TTI # m and # m+1 periods corresponding to first TTI # n, to the radio base station.

Note that the size that can be transmitted and received can be the number of transport block bits (DL/UL-SCH TB bits) in the DL shared channel and/or the UL shared channel. The downlink control channel can be the PDCCH and/or the EPDCCH.

Alternatively, the user terminal can report to the radio base station information on the size that can be transmitted and received in one TTI of each CC included in a normal TTI (first TTI) period and/or information on the number of times of blind decoding of a downlink control channel (see FIG. 22B)). For example, in FIG. 22B, the user terminal reports capability information (first capability information), taking CC #1 to CC #4 of the first TTI # n period and CC #5 to CC #9 in the second TTI # m period corresponding to a part of the first TTI # n period, to the radio base station. Further, the user terminal reports capability information (second capability information), taking CC #1 to CC #4 of the first TTI # n period and CC #5 to CC #9 in the second TTI # m+1 period corresponding to a part of the first TTI # n period, to the radio base station. The user terminal may transmit both the first capability information and the second capability information to the radio base station, or the user terminal may transmit one capability information (for example, the capability information with the smaller bit size and the smaller number of times of blind decoding) to the radio base station.

As shown in FIG. 22B, when, for shortened TTIs, the size that can be transmitted and received and the number of times of blind decoding are determined by the user terminal for each shortened TTI (unit of transmission) and transmitted to the radio base station, compared to the case of FIG. 22A, the radio base station can configure more sizes and numbers of times of blind decoding.

(Radio Communication System)

Now, the structure of the radio communication system according to an embodiment of the present invention will be described below. In this radio communication system, the radio communication methods of the above-described embodiments are employed. Note that the radio communication methods of the above-described embodiments may be applied individually or may be applied in combination.

Figure 23:
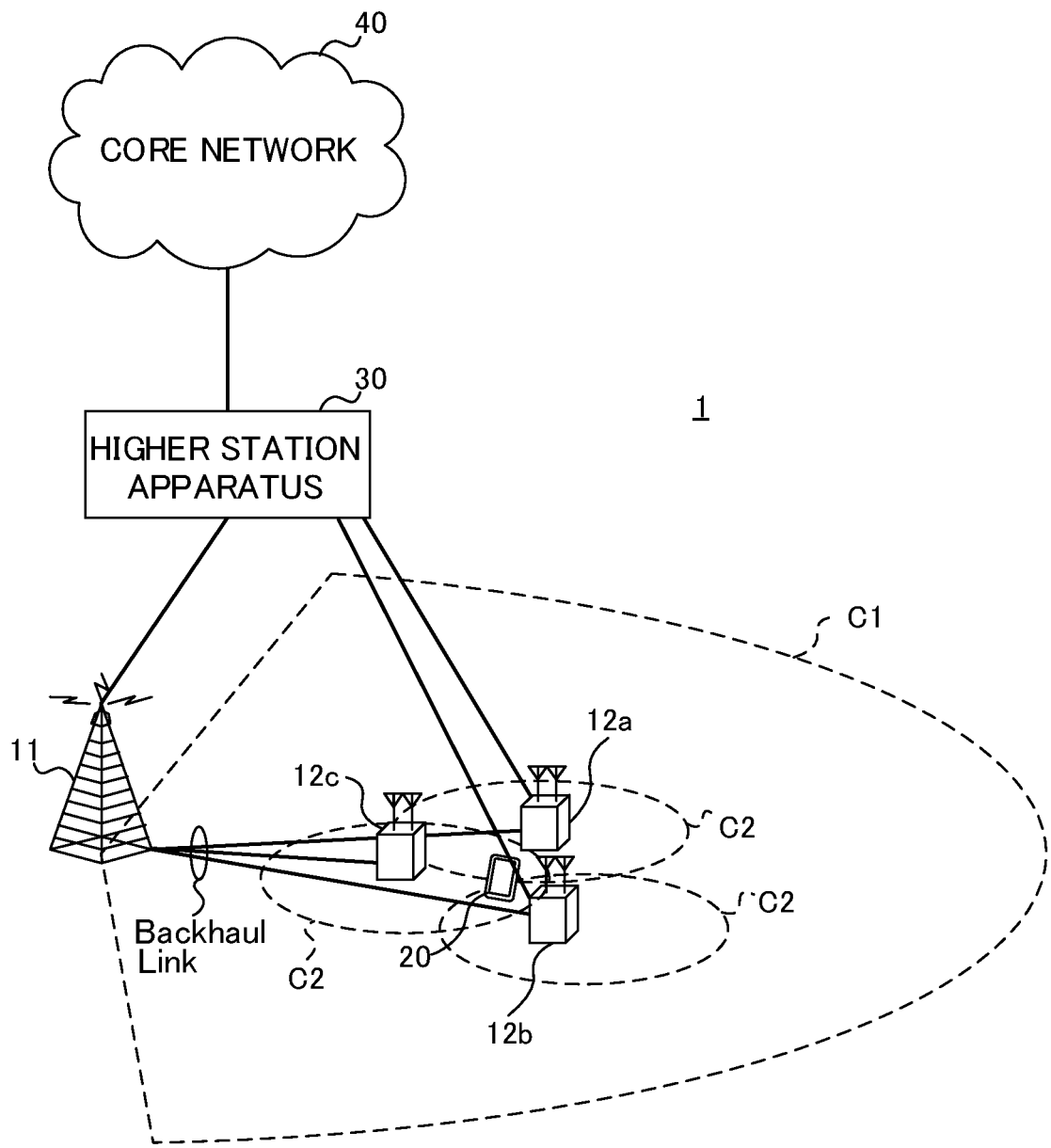
FIG. 23 is a diagram to show an example of a schematic structure of a radio communication system according to the present embodiment.

FIG. 23 is a diagram to show an example of a schematic structure of a radio communication system according to one embodiment of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 23 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to make communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

<Radio Base Station>

Figure 24:
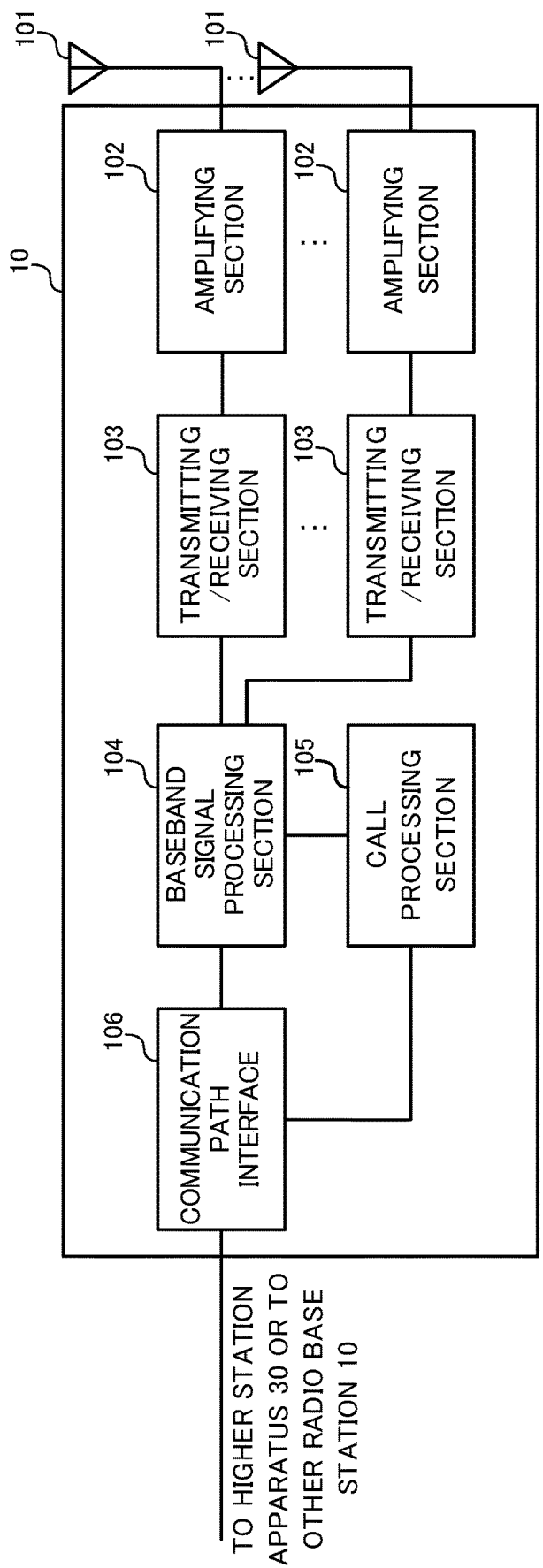
FIG. 24 is a diagram to show an example of an overall structure of a radio base station according to present embodiment.

FIG. 24 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections (transmitting sections) 103 transmit DL signals from a plurality of CCs. Further, the transmitting/receiving sections (transmitting sections) 103 can transmit CC group information, which includes information about at least one of the CC groups to configure in the user terminal, the TTI durations of the CC groups, the CCs included in the CC groups, and the TTI durations of the CCs. Also, when counter DAIs and/or total DAIs are applied, the transmitting/receiving sections (transmitting sections) 103 include counter DAI and/or total DAIs in the downlink control information (for example, DL assignment) of the scheduling CCs). As for the application method of counter DAIs and total DAIs, any of the methods described in the above embodiments can be applied.

The transmitting/receiving sections (receiving sections) 103 receive UL signals transmitted for each CC group formed with at least one CC (for example, A/N, PUSCH, CSI, etc.). The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 25:
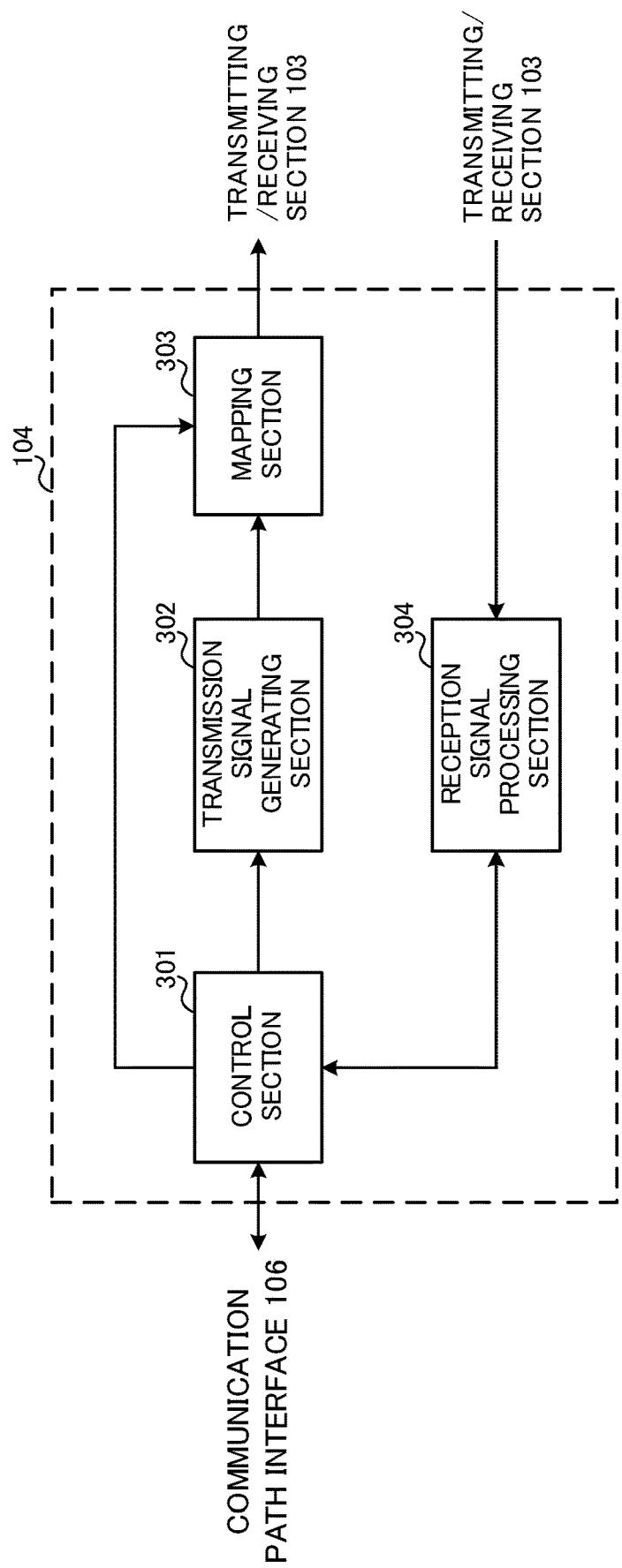
FIG. 25 is a diagram to show an example of a functional structure of a radio base station according to present embodiment.

FIG. 25 is a diagram to show an example of a functional structure of a radio base station according to the present embodiment. Note that, although FIG. 25 primarily shows functional blocks that pertain to characteristic parts of the present embodiment, the radio base station 10 has other functional blocks that are necessary for radio communication as well. As shown in FIG. 25, the baseband signal processing section 104 has a control section (scheduler) 301, a transmission signal generation section (generation section) 302, a mapping section 303 and a received signal processing section 304.

The control section (scheduler) 301 controls the scheduling (for example, resource allocation) of downlink data signals that are transmitted in the PDSCH and downlink control signals that are communicated in the PDCCH and/or the EPDCCH. Also, the control section 301 controls the scheduling of system information, synchronization signals, paging information, CRSs (Cell-specific Reference Signals), CSI-RSs (Channel State Information Reference Signals) and so on. Furthermore, the control section 301 also controls the scheduling of uplink reference signals, uplink data signals that are transmitted in the PUSCH, and uplink control signals that are transmitted in the PUCCH and/or the PUSCH.

The control section 301 controls the retransmission of downlink data/new data transmission based on delivery acknowledgment signals (HARQ-ACKs) fed back from the user terminals. Further, the control section 301 controls reception processing of HARQ-ACK fed back from the user terminal based on the bundling window in response to DL transmission. Note that the reception processing may be performed in the received signal processing section 304 based on commands from the control section 301. Further, the control section 301 can configure the CC groups to be configured in the user terminal. The methods described in the above embodiments can be applied as methods of configuring CCs that form CC groups (FIG. 5, FIG. 11, etc.). For the control section 301, a controller, a control circuit or a control device that can be described based on common understanding of the technical field to which the present invention pertains can be used.

The transmission signal generation section 302 generates DL signals (downlink control signals, downlink data signals, downlink reference signals and so on) based on commands from the control section 301, and outputs these signals to the mapping section 303. To be more specific, the transmission signal generation section 302 generates a downlink data signal (PDSCH) including user data, and outputs it to the mapping section 303. Further, the transmission signal generation section 302 generates a downlink control signal (PDCCH/EPDCCH) including DCI (UL grant), and outputs it to the mapping section 303. Further, the transmission signal generation section 302 generates downlink reference signals such as CRS and CSI-RS, and outputs them to the mapping section 303.

When counter DAIs and/or total DAIs are applied, the transmission signal generation section 302 generates downlink control information (for example, DL assignment) including counter DAIs and/or total DAIs. When CA is performed between CCs with different TTI durations, the transmission signal generation section 302 can individually apply counter DAIs and/or total DAIs between CCs with the same TTI duration (see FIG. 15.) (CCs in the same CC group). Alternatively, the control section 301 may apply counter DAIs and/or total DAIs between CCs with different TTI durations (see FIG. 16). Also, when consecutive counter DAIs are configured between TTIs that are different in time, the control section 301 can configure counter DAIs that count up based on a predetermined rule (FIG. 17 to FIG. 21)). For the transmission signal generation section 302, a signal generator, a signal generating circuit or a signal generating device that can be described based on common understanding of the technical field to which the present invention pertains can be used.

The mapping section 303 maps the downlink signals generated in the transmission signal generation section 302 to predetermined radio resources based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs the reception process (for example, demapping, demodulation, decoding, etc.) of the UL signals (HARQ-ACK, PUSCH, etc.) transmitted from the user terminal 20. The processing results are output to the control section 301. The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 26:
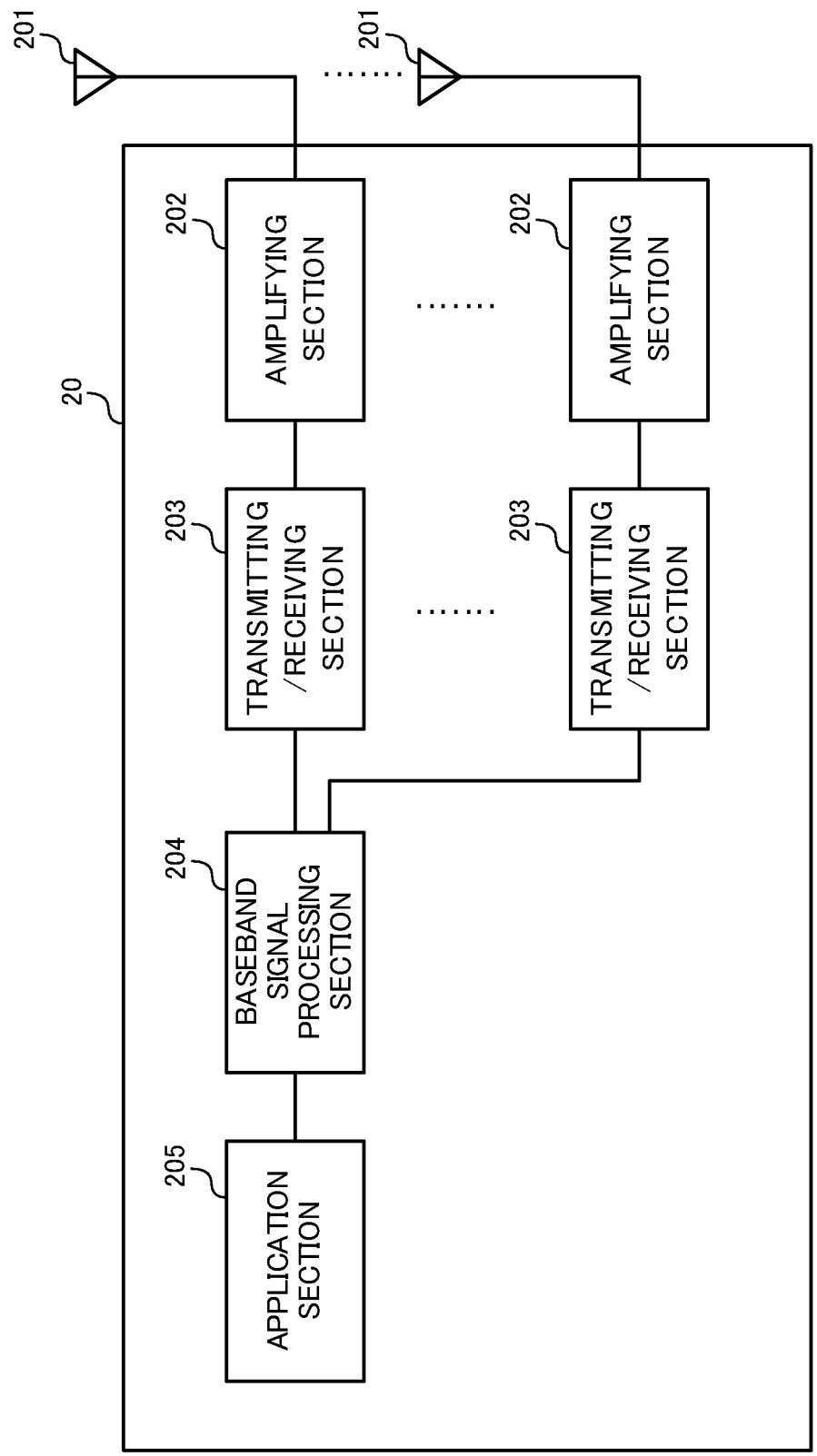
FIG. 26 is a diagram to show an example of an overall structure of a user terminal according to present embodiment.

FIG. 26 is a diagram to show an example of an overall structure of a user terminal according to an embodiment of the present invention. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections (receiving sections) 203 receive DL signals transmitted from a plurality of component carriers (CCs). Further, the transmitting/receiving sections (receiving sections) 203 transmit CC group information including at least one of the CC groups to be configured, the TTI duration in the CC groups, the CCs included in the CC groups, and the information on the TTI duration of the CCs. Further, the transmitting/receiving sections (receiving sections) 203 can receive downlink control information including counter DAIs and/or total DAIs. The transmitting/receiving sections (transmitting sections) 203 transmit UL signal to predetermined CCs. When CA is applied, the transmitting/receiving sections (transmitting sections) 203 can feed back uplink control information (for example, A/Ns) in response to DL data in each CC in predetermined CCs.

Further, the transmitting/receiving sections 203 (transmitting sections) transmit information on the size that can be transmitted and received over all TTIs included in a normal TTI (first TTI) period and/or information on the number of times of blind decoding of a downlink control channel (see FIG. 22A)). Alternatively, the transmitting/receiving sections (transmitting sections) 203 transmit information on the size that can be transmitted and received in one TTI of each CC included in a normal TTI (first TTI) period and/or information on the number of times of blind decoding of a downlink control channel (see FIG. 22B)). For the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Figure 27:
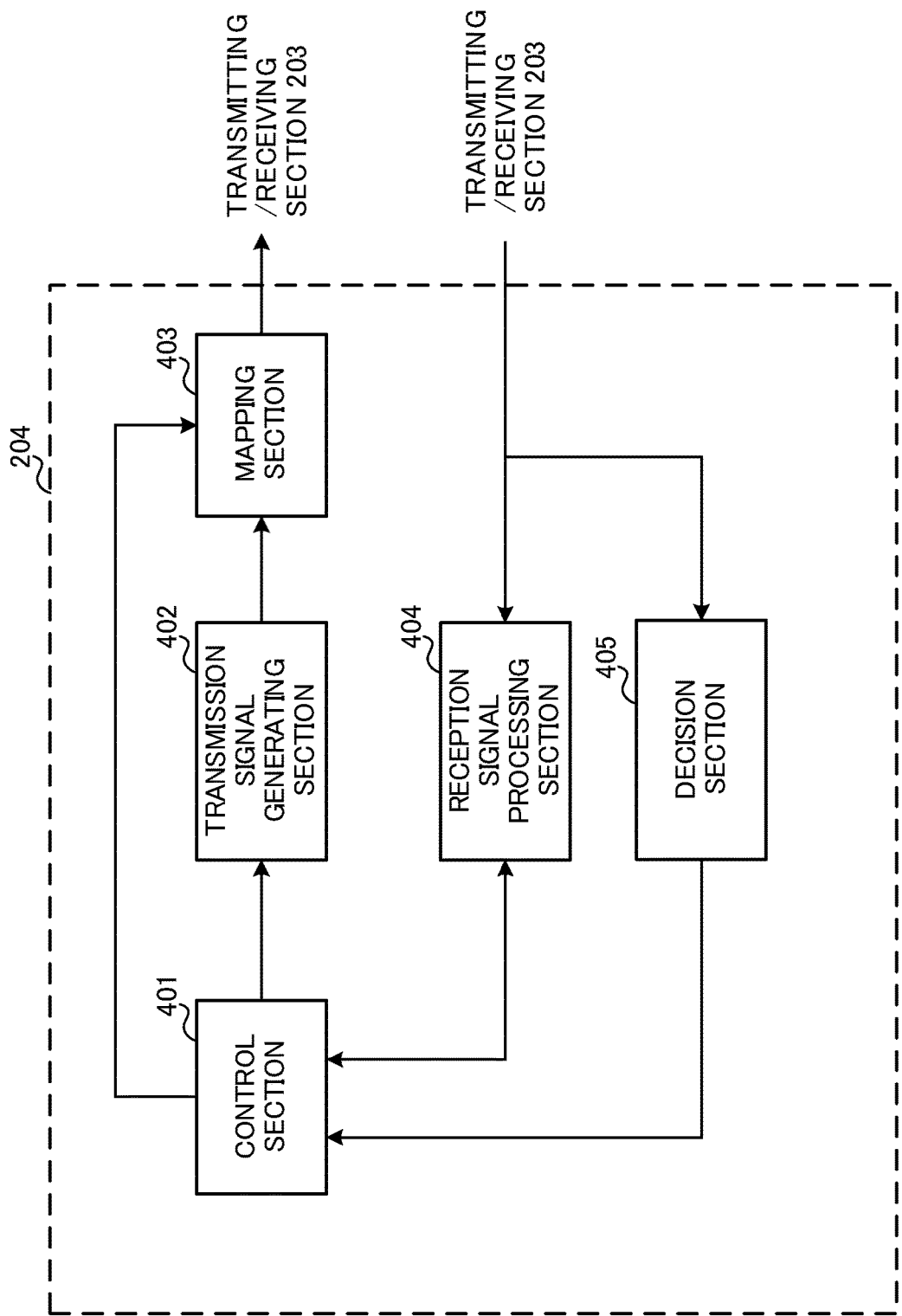
FIG. 27 is a diagram to show an example of a functional structure of a user terminal according to present embodiment.

FIG. 27 is a diagram to show an example of a functional structure of a user terminal according to the present embodiment. Note that, although FIG. 27 primarily shows functional blocks that pertain to characteristic parts of the present embodiment, the user terminal 20 has other functional blocks that are necessary for radio communication as well. As shown in FIG. 27, the baseband signal processing section 204 provided in the user terminal 20 has a control section 401, a transmission signal generation section 402, a mapping section 403, a received signal processing section 404 and a decision section 405.

The control section 401 acquires downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. To be more specific, the control section 401 can control the transmission signal generation section 402, the mapping section 403 and the received signal processing section 404.

The control section 401 can control UL signal transmission for each CC group formed with at least one CC according to the TTI duration (see FIG. 6). For example, the control section 401 controls the transmission of uplink data and/or uplink control information for a plurality of CC groups at different timings. Also, when the transmission periods of UL signals for multiple CCs with different TTI durations overlap, the control section 401 can preferentially configure UL transmission power to CC with earlier transmission timings (see FIG. 7).

The control section 401 can control A/N transmission based on counter DAIs and/or total DAIs, which are configured per CC group and included in downlink control information (see FIG. 10). For example, the control section 401 can determine the number of scheduling CCs in each CC group based on counter DAIs and/or total DAIs that are configured on a per CC group basis.

Alternatively, the control section 401 can control the transmission of UL signals in CC groups formed with a plurality of CCs having different TTI durations (see FIG. 12)). For example, in a CC group formed with a plurality of CCs having different TTI durations, the control section 401 performs control so that the uplink control information corresponding to each CC is transmitted in a predetermined CC at different timings according to the TTI duration of each CC (see FIG. 12 to FIG. 14)). Also, between CCs with different TTI durations, the control section 401 can perform control so that A/Ns in response to DL data scheduled at different timings are simultaneously transmitted in a predetermined CC. Also, between CCs with different TTI durations, the control section 401 can perform control so that UL data in response to UL grants scheduled at different timings are transmitted at the same timing). For the control section 401, a controller, a control circuit or a control device that can be described based on common understanding of the technical field to which the present invention pertains can be used.

The transmission signal generation section 402 generates UL signals based on commands from the control section 401, and outputs these signals to the mapping section 403. For example, the transmission signal generation section 402 generates uplink control signals such as delivery acknowledgement signals (HARQ-ACKs), channel state information (CSI) and so on, based on commands from the control section 401.

Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal. For the transmission signal generation section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generation section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401 and the decision section 405. The received signal processing section 404 outputs, for example, broadcast information, system information, RRC signaling, DCI and so on, to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

The decision section 405 makes retransmission control decisions (ACKs/NACKs) based on the decoding results in the receiving process section 404, and, furthermore, outputs the results to the control section 401. When downlink signals (PDSCH) are transmitted from multiple CCs (for example, six or more CCs), retransmission control decisions (ACKs/NACKs) are made on a per CC basis, and output to the control section 401. For the decision section 405, a decision maker, a decision making circuit or a decision making device that can be described based on common understanding of the technical field to which the present invention pertains can be used.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and by using these multiple devices.

Figure 28:
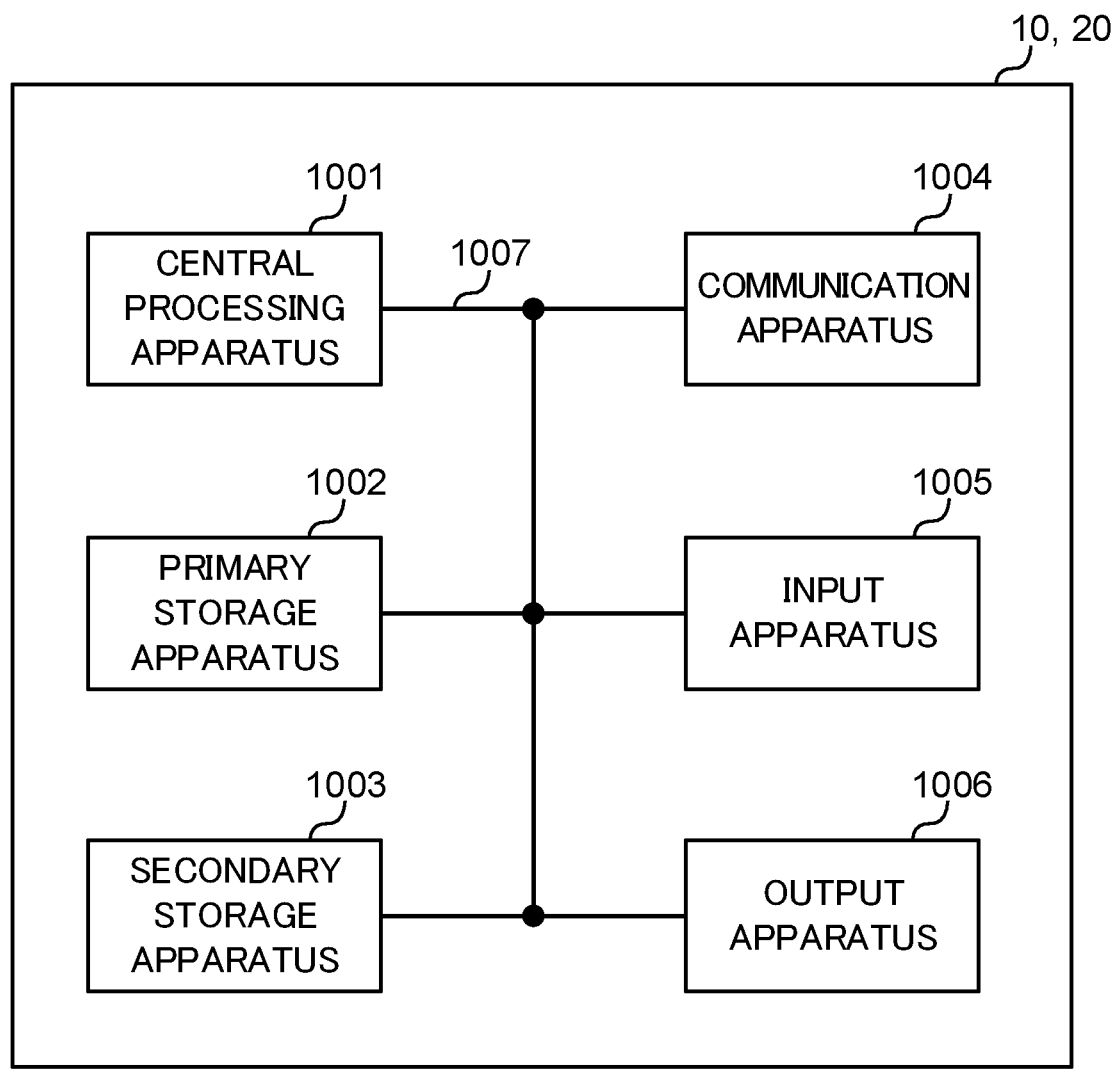
FIG. 28 is a diagram to show an example hardware structure of a radio base station and a user terminal according to an embodiment of the present invention.

That is, the radio base stations, user terminals and so according to embodiments of the present invention may function as a computer that executes the processes of the radio communication method of the present invention. FIG. 28 is a diagram to show an example hardware structure of a radio base station and a user terminal according to an embodiment of the present invention. Physically, a radio base station 10 and a user terminal 20, which have been described above, may be formed as a computer apparatus that includes a processor 1001, a memory 1002, a storage 1003, a communication apparatus 1004, an input apparatus 1005, an output apparatus 1006 and a bus 1007.

Note that, in the following description, the word "apparatus" may be replaced by "circuit," "device," "unit" and so on. Note that the hardware structure of the radio base station 10 and the user terminal 20 may be designed to include one or more of each apparatus shown in the drawings, or may be designed not to include part of the apparatuses.

Each function of the radio base station 10 and the user terminal 20 is implemented by reading predetermined software (programs) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU) including an interface with a peripheral device, a control device, a computing device, a register, and the like. For example, the above-described baseband signal process section 104 (204), call processing section 105 and so on may be implemented by the central processing apparatus 1001.

Further, the processor 1001 reads a program (program code), a software module or data from the storage 1003 and/or the communication device 1004 to the memory 1002, and executes various processes according to these. As for the programs, programs to allow the computer to execute at least part of the operations of the above-described embodiments may be used. For example, the control section 401 of the user terminals 20 may be stored in the memory 1002 and implemented by a control program that operates on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer readable recording medium, and is configured with at least one of an optical disk such as a CD-ROM (Compact Disc ROM), a hard disk drive, a flexible disk, a magneto-optical disk, a flash memory and so on. The storage 1003 may be referred to as a "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Further, the respective devices such as the processor 1001 and the memory 1002 are connected by a bus 1007 for communicating information. The bus 1007 may be formed with a single bus, or may be formed with buses that vary between the apparatuses.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. Further, a slot may be comprised of one or more symbols (OFDM symbols, SC-FDMA symbols, etc.) in the time domain.

A radio frame, a subframe, a slot and a symbol all represent the time unit in signal communication. Radio frames, subframes, slots and symbols may be called by other names. For example, one subframe may be referred to as a "transmission time interval" (TTI), or a plurality of consecutive subframes may be referred to as a "TTI," and one slot may be referred to as a "TTI." That is, a subframe and a TTI may be a subframe (one ms) in existing LTE, may be a shorter period than one ms (for example, 1 to 13 symbols), or may be a longer period of time than one ms.

Here, a TTI refers to the minimum time unit of scheduling in wireless communication, for example. For example, in LTE systems, the radio base station schedules the allocation radio resources (such as the frequency bandwidth and transmission power that can be used by each user terminal) to each user terminal in TTI units. The definition of TTIs is not limited to this.

A resource block (RB) is a resource allocation unit in the time domain and the frequency domain, and may include one or a plurality of consecutive subcarriers in the frequency domain. Also, an RB may include one or more symbols in the time domain and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," or the like.

Further, a resource block may be comprised of one or more resource elements (REs). For example, one RE may be a radio resource field of one subcarrier and one symbol.

Note that the structures of radio frames, subframes, slots, symbols and the like described above are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Further, the radio base station in this specification may be read by a user terminal. For example, each aspect/embodiment of the present invention may be applied to a configuration in which communication between a radio base station and a user terminal is replaced with communication of a plurality of user terminals (D2D: Device-to-Device). In this case, the user terminal 20 may have the functions of the radio base station 10 described above. In addition, wording such as "uplink" and "downlink" may be interpreted as "side." For example, an uplink channel may be interpreted as a side channel.

Likewise, a user terminal in this specification may be interpreted as a radio base station. In this case, the radio base station 10 may have the functions of the user terminal 20 described above.

The examples/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these. Also, RRC signaling may be referred to as "RRC messages," and can be, for example, an RRC connection setup message, RRC connection reconfiguration message, and so on. Also, the MAC signaling may be reported, for example, by a MAC control element (MAC CE (Control Element)).

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-255282, filed on Dec. 25, 2015, including the specification, drawings and abstract, is incorporated herein by reference in its entirety.

The invention claimed is:

1. A terminal that communicates with a plurality of cells, the terminal comprising:
 a receiver that receives multiple downlink control information including a counter Downlink Assignment Indicator (DAI) from the plurality of cells by using different time interval durations; and
 a transmitter that transmits a delivery acknowledgement signal for a downlink shared data channel received from each of the plurality of cells based on the counter DAI,
 wherein some of the plurality of cells use a time interval duration different from other cells,
 wherein the counter DAI has a value that is counted up in a cell direction and is then counted up in a time direction.

2. A radio base station that communicates with a plurality of cells, the radio base station comprising:
 a transmitter that transmits multiple downlink control information including a counter Downlink Assignment Indicator (DAI) from the plurality of cells by using different time interval durations; and
 a processor that sets in the counter DAI a value that is counted up in a cell direction and is then counted up in a time direction,
 wherein some of the plurality of cells use a time interval duration different from other cells.

3. A radio communication method for a terminal that communicates with a plurality of cells, the radio communication method comprising:
 receiving multiple downlink control information including a counter Downlink Assignment Indicator (DAI) from the plurality of cells by using different time interval durations; and
 transmitting a delivery acknowledgement signal for a downlink shared data channel received from each of the plurality of cells based on the counter DAI,
 wherein some of the plurality of cells use a time interval duration different from other cells,
 wherein the counter DAI has a value that is counted up in a cell direction and is then counted up in a time direction.

* * * * *